US009434279B2

(12) United States Patent
Williams

(10) Patent No.: US 9,434,279 B2
(45) Date of Patent: Sep. 6, 2016

(54) CHILD SAFETY SEAT ASSEMBLIES

(71) Applicant: Wonderland Nurserygoods Company Limited, Central Hong Kong (HK)

(72) Inventor: Bruce L. Williams, Narvon, PA (US)

(73) Assignee: Wonderland Nurserygoods Company Ltd., Hong Kong (HK)

( * ) Notice: Subject to any disclaimer, the term of this patent is extended or adjusted under 35 U.S.C. 154(b) by 82 days.

(21) Appl. No.: 14/220,360

(22) Filed: Mar. 20, 2014

(65) Prior Publication Data
US 2014/0284977 A1    Sep. 25, 2014

Related U.S. Application Data

(60) Provisional application No. 61/852,723, filed on Mar. 20, 2013, provisional application No. 61/961,692, filed on Oct. 21, 2013.

(51) Int. Cl.
*B60N 2/42* (2006.01)
*B60N 2/28* (2006.01)

(52) U.S. Cl.
CPC ........... *B60N 2/2821* (2013.01); *B60N 2/2842* (2013.01); *B60N 2/2884* (2013.01); *B60N 2/286* (2013.01)

(58) Field of Classification Search
CPC  B60N 2/2821; B60N 2/2839; B60N 2/2863; B60N 2/2884
USPC ........................... 297/216.11, 256.14, 256.16
See application file for complete search history.

(56) References Cited

U.S. PATENT DOCUMENTS

| | | | | |
|---|---|---|---|---|
| 6,145,927 A * | 11/2000 | Lo | ......... | A47D 13/025 297/183.3 |
| 6,375,260 B1 * | 4/2002 | Hiramatsu | ........... | B60N 2/2821 297/250.1 |
| 6,860,557 B2 * | 3/2005 | Jonasson | ................ | B60N 3/063 297/219.12 |
| 6,988,773 B2 * | 1/2006 | McMakin | ................ | B60N 2/28 297/256.16 |
| 7,097,245 B2 * | 8/2006 | Barker | ................. | B60N 2/2803 297/256.14 |
| 7,559,606 B2 * | 7/2009 | Hei | ...................... | B60N 2/2806 297/130 |
| 7,845,722 B1 * | 12/2010 | Manenti | ............... | A47D 13/102 297/181 |
| 7,887,129 B2 * | 2/2011 | Hei | ...................... | B60N 2/2806 297/256.13 |
| 2014/0354021 A1 * | 12/2014 | Sedlack | ............... | B60N 2/2821 297/216.11 |

FOREIGN PATENT DOCUMENTS

| | | |
|---|---|---|
| CN | 1976830 A | 6/2007 |
| CN | 202071721 U | 12/2011 |

(Continued)

OTHER PUBLICATIONS

The Office Action from co-pending Chinese Patent Application No. 201410104390.7 dated Nov. 4, 2015.

*Primary Examiner* — Syed A Islam
(74) *Attorney, Agent, or Firm* — Baker & McKenzie LLP

(57) ABSTRACT

A child safety seat assembly includes a support base and a child carrier. The support base includes a shell body, an anti-rebound frame and a latch. The shell body has a bottom surface that supports the support base when resting on a support surface, and an upper surface for installing a child carrier. The anti-rebound frame is assembled with the shell body, the anti-rebound frame being movable up and down relative to the shell body to extend upward past the upper surface and to extend downward past the bottom surface. The latch is operable to lock the anti-rebound frame with the shell body.

32 Claims, 21 Drawing Sheets

(56) References Cited

FOREIGN PATENT DOCUMENTS

| CN | 102371920 A | 3/2012 |
| CN | 202319975 U | 7/2012 |
| EP | 2022663 A2 | 2/2009 |
| GB | 2492270 A | 12/2012 |
| JP | 2007536161 A | 12/2007 |

* cited by examiner

CHILD SAFETY SEAT ASSEMBLIES

CROSS-REFERENCE TO RELATED APPLICATIONS

This application claims priority to U.S. Provisional Patent Application No. 61/852,723 filed on Mar. 20, 2013, and to U.S. Provisional Patent Application No. 61/961,692 filed on Oct. 21, 2013, both of which are incorporated herein by reference.

BACKGROUND

1. Field of the Invention

The present invention relates to child safety seat assemblies.

2. Description of the Related Art

Conventionally, an automobile vehicle has seatbelts provided at the front and rear seats. The seatbelt generally includes shoulder and lap straps that may be fastened with an anchor point of the vehicle to restrain and protect the occupant in case of collision or sudden stop of the vehicle. However, the use of the vehicle seatbelt is not adapted for a young child who has a smaller body and may not be able to sustain the pressure applied by the seatbelt. Therefore, safety legislations require the use of a child safety seat for seating a young child in a vehicle. The child safety seat can be attached with a lower anchorage fixture provided in the vehicle, whereas the child safety seat has a separate harness more adapted to restrain the young child.

To ensure enhanced protection for a young child, it is usually recommended that the child safety seat is installed in a rearward facing position so that the front of the child safety seat faces the seatback of the vehicle seat. When a frontal or rear collision occurs, the child safety seat and the child sitting thereon may be forcibly thrown towards the rear of the vehicle, which may cause the child's head to contact the vehicle seatback. While this rarely results in serious injury, it is still desirable to decrease this rearward motion and eliminate any contact between the child and the vehicle. Accordingly, certain child safety seat may have an "anti-rebound bar" that can abut against the seatback of the vehicle seat at a sufficient height to counteract upward and rearward rotation of the child safety seat. Unfortunately, the current designs of the anti-rebound bar can be bulky, unsightly, and can increase the volume of the child safety seat, which results in higher shipping costs.

Therefore, there is a need for child safety seat assemblies that are more flexible and convenient in use, and can address at least the foregoing issues.

SUMMARY

The present application describes a child safety seat assembly that includes a support base and a child carrier. In some embodiments, the support base includes a shell body, an anti-rebound frame and a latch. The shell body has a bottom surface that supports the support base when resting on a support surface, and an upper surface for installing a child carrier. The anti-rebound frame is assembled with the shell body, the anti-rebound frame being movable up and down relative to the shell body to extend upward past the upper surface and to extend downward past the bottom surface. The latch is operable to lock the anti-rebound frame with the shell body.

DETAILED DESCRIPTION OF THE EMBODIMENTS

Figure 1:
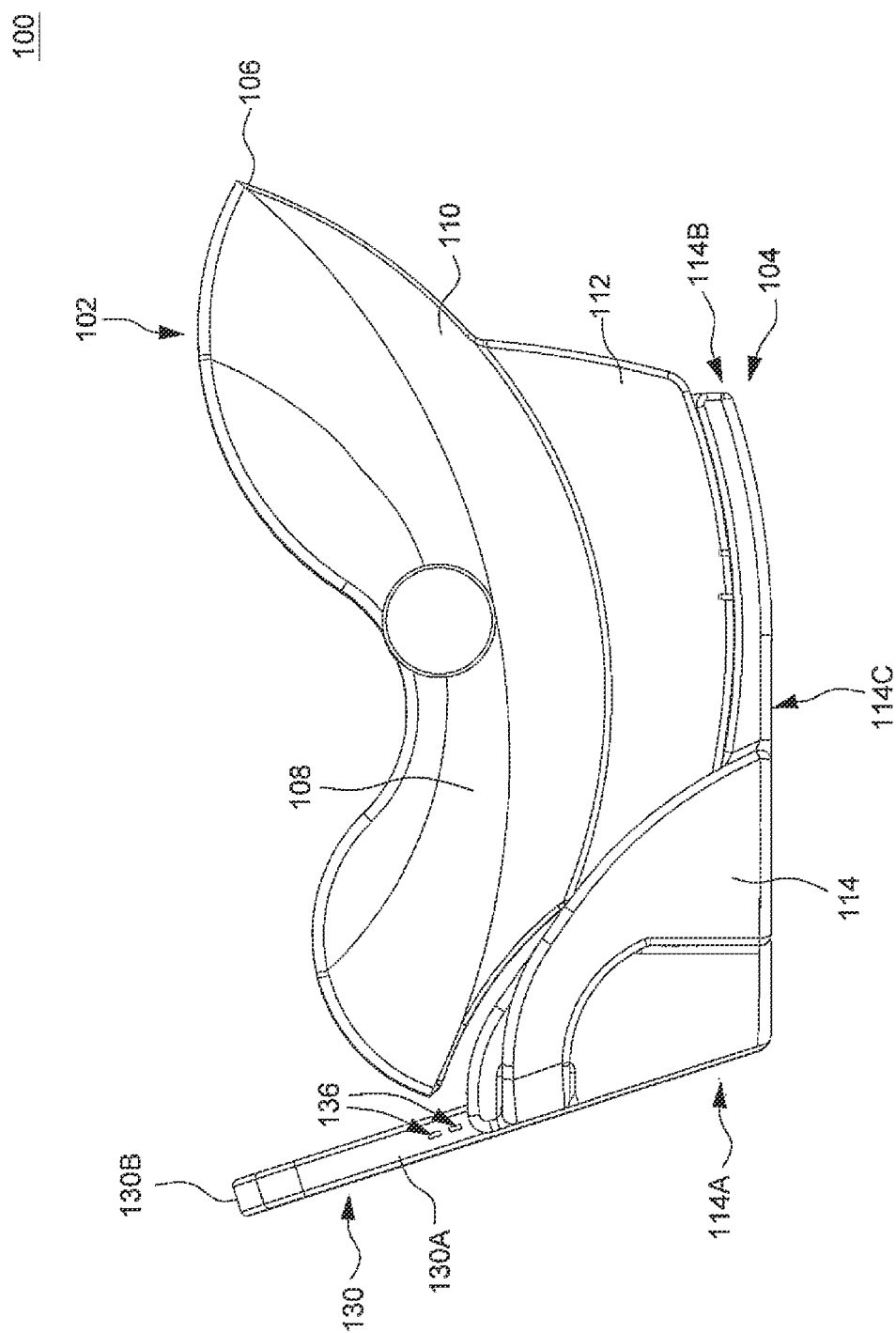
FIG. 1 is a schematic view illustrating an embodiment of a child safety seat assembly.

FIG. 1 is a schematic view illustrating an embodiment of a child safety seat assembly 100. The child safety seat assembly 100 can include a child carrier 102 and a support base 104. The child carrier 102 includes a seat shell 106 having a seat portion 108 and a seatback 110. The seat shell 106, including the seat portion 108 and the seatback 110, can be formed by plastic molding. The seat shell 106 can include a fastener system (not shown) that is assembled adjacent to two support foot 112 protruding from an underside of the seat shell 106. This fastener system can be operable to lock and unlock the child carrier 102 with respect to the support base 104, and can be configured to allow installation of the child carrier 102 on the support base 104 in a suitable configuration on a vehicle seat, in particular in a position facing rearward.

Figure 2:
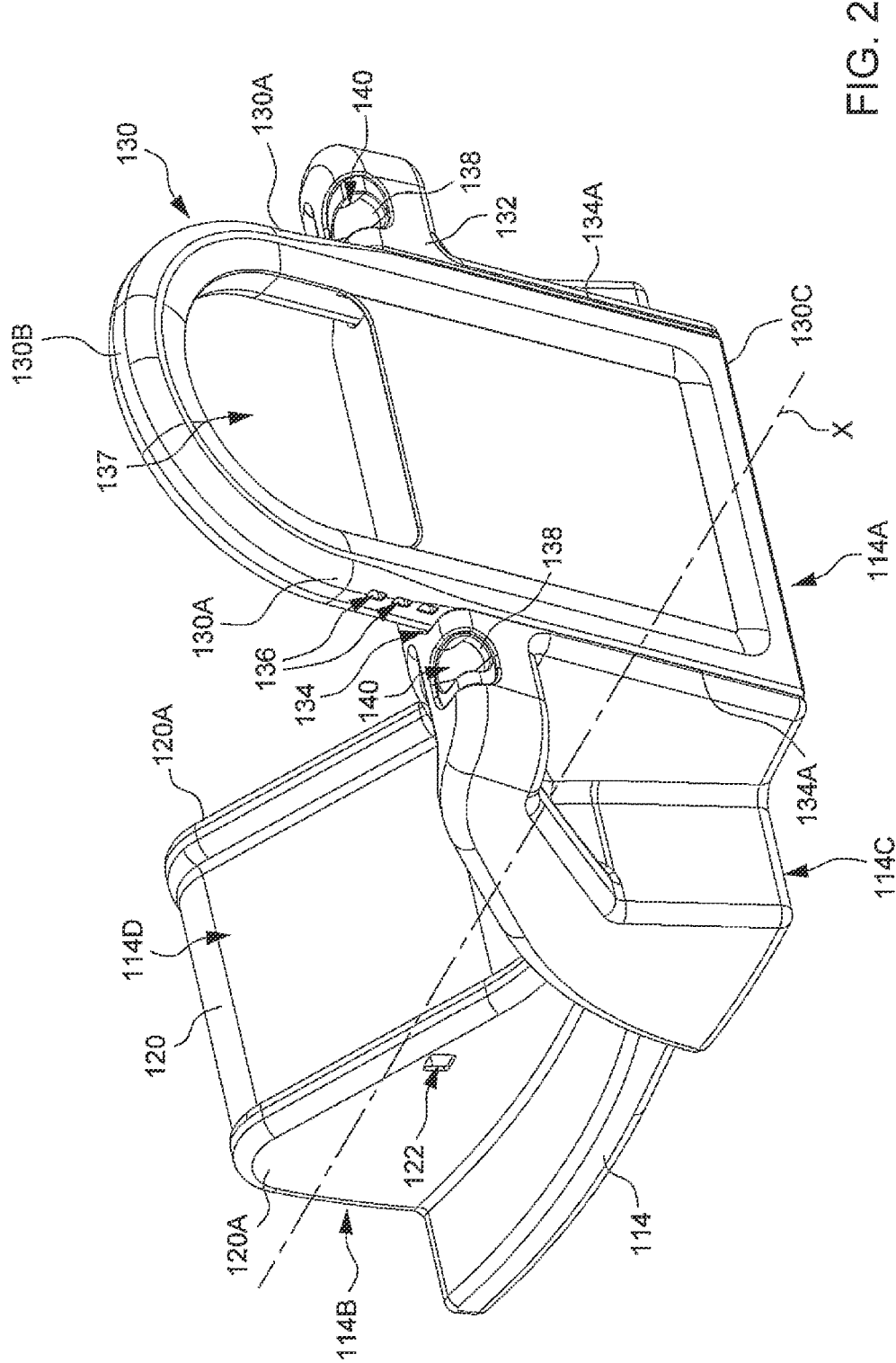
FIG. 2 is a schematic view illustrating an embodiment of a support base used in the child safety seat assembly shown in FIG. 1.

In conjunction with FIG. 1, FIG. 2 is a schematic view illustrating an embodiment of the support base 104. The support base 104 can include a shell body 114 extending along a lengthwise axis X between two opposite ends 114A and 114B. The shell body 114 can have an enlarged bottom surface 114C facing downward, and an upper surface 114D facing upward. The bottom surface 114C can be substantially flat, and can provide stable support when the support base 104 rests on a support surface, for example a passenger's seat of a vehicle. The upper surface 114D can be configured to receive the installation of the child carrier 102. For example, the upper surface 114D can include an upwardly raising portion 120 having an anchoring structure adapted to engage with the fastener system of the child carrier 102. Examples of the anchoring structure provided on the raising portion 120 can include symmetrical locking openings 122 (only one is shown in FIG. 2) formed through two lateral surfaces 120A of the raising portion 120. When the child carrier 102 is installed on the upper surface 114D with the front of the seat portion 108 turned toward the end 114A of the shell body 114, two latches (not shown) assembled with the support foot 112 can respectively engage through the locking openings 122 to lock the child carrier 102 in place. The child safety seat assembly 100 thereby formed can be installed on a vehicle seat in a rearward facing position, the end 114A of the shell body 114 abutting against the seatback of the vehicle seat.

For preventing rebound of the child safety seat assembly 100 against the seatback of the vehicle seat during a vehicle collision, the shell body 114 can be assembled with an anti-rebound frame 130 adjacent to the end 114A. In addition to preventing rebound of the child safety seat assembly 100, the anti-rebound frame 130 may also be operable to adjust a recline position of the child safety seat assembly 100.

Referring to FIGS. 1 and 2, the two opposite ends 114A and 114B of the shell body 114 can have different heights. In particular, the end 114A of the shell body 114 can rise at a height that is greater than the height of the end 114B. For assembling the anti-rebound frame 130, the end 114A of the shell body 114 can have an end surface 132 formed with a channel 134. The channel 134 can be opened on the bottom surface 114C and extend vertically upward, and can have a left and a right sidewalls 134A facing each other.

The anti-rebound frame 130 can be assembled through the channel 134 where it can be guided for upward and downward movement relative to the shell body 114. In one embodiment, the anti-rebound frame 130 can include two side portions 130A, and can extend between an upper and a lower end 130B and 130C that are respectively connected with the two side portions 130A. In one embodiment, the anti-rebound frame 130, including the two side portions 130A and the upper and lower ends 130B and 130C, can be integrally formed in one single body. Each of the two side portions 130A can include a plurality of locking openings 136 distributed in a row along the side portion 130A. For facilitating grasping of the anti-rebound frame 130, an opening 137 can be formed through the anti-rebound frame 130, and the upper end 130B can have an arc shape. When the anti-rebound frame 130 is assembled through the channel 134, the two side portions 130A can be respectively positioned adjacent to the two sidewalls 134A of the channel 134, and the upper end 130B can project above the upper surface 114D of the shell body 114. Moreover, the anti-rebound frame 130 can slide upward and downward relative to the shell body 114 to extend upward past the upper surface 114D and to extend downward past the bottom surface 114C.

For locking the anti-rebound frame 130 in place, the shell body 114 can be further assembled with one or more latches 138. For example, two latches 138 can be respectively assembled with the shell body 114 adjacent to the two sidewalls 134A of the channel 134. Each of the latches 138 can have one or more engaging ends 138A (two engaging ends 138A are exemplary shown) that can respectively engage with one corresponding side portion 130A of the anti-rebound frame 130. Moreover, each latch 138 can be partially exposed outward through a corresponding opening 140 of the shell body 114 for manual operation. In one embodiment, each of the latches 138 including the engaging ends 138A can be formed as an integral part, and the two latches 138 can be respectively arranged near a left and a right border of the shell body 114.

In some embodiments, each of the latches 138 can also be connected with a spring (not shown) that can urge the latch 138 toward the channel 134. The two latches 138 can be thereby biased toward a locking state for holding the anti-rebound frame 130 in place.

The two latches 138 can be movable transversally relative to the shell body 114 to cause the engaging ends 138A to extend through the sidewalls 134A into the interior of the channel 134 for engaging with two ones of the locking openings 136 on the side segments 130A, or to cause the engaging ends 138A to substantially withdraw from the channel 134 to disengage from the locking openings 136.

Figure 3:
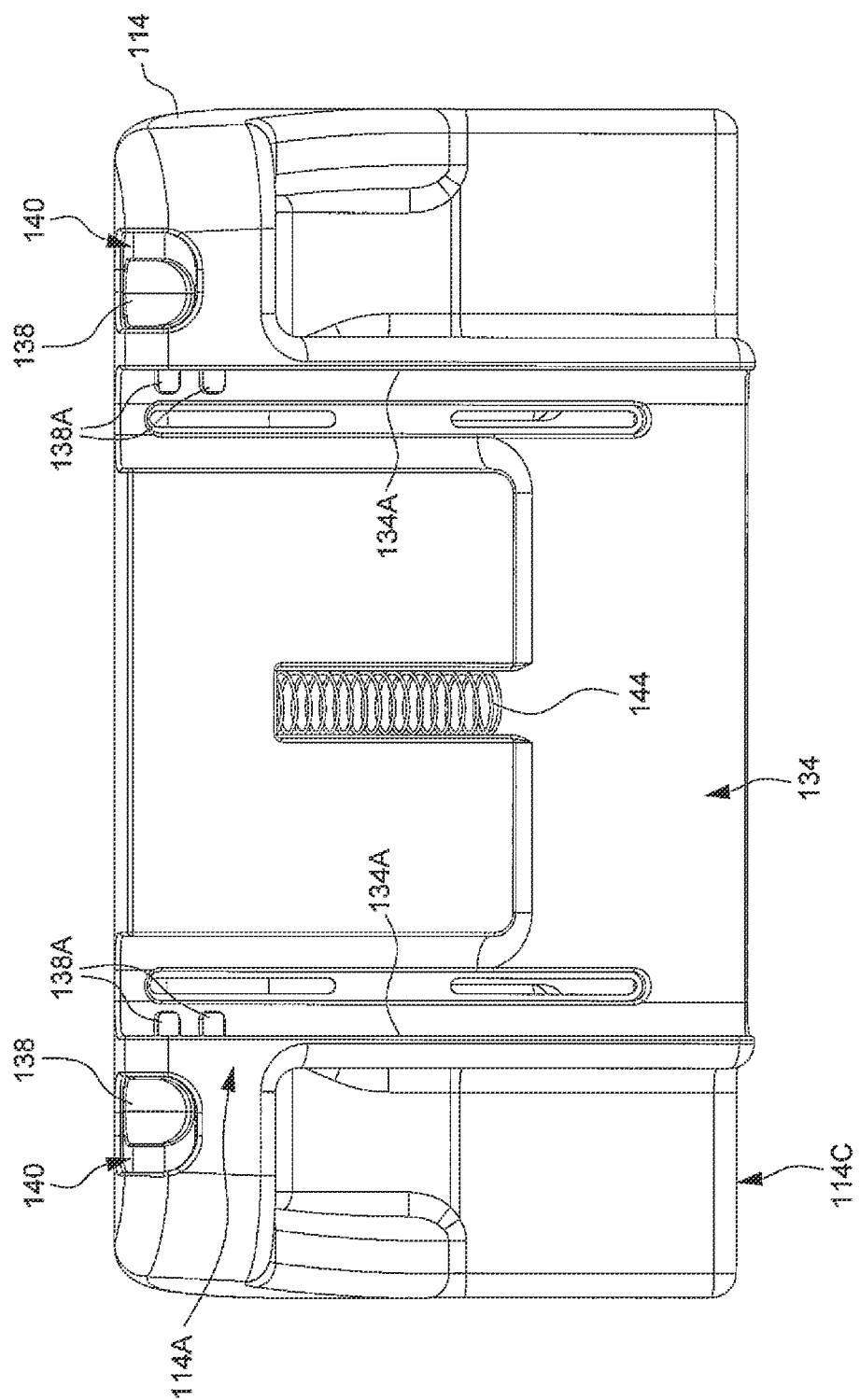
FIG. 3 is a schematic view illustrating an end portion of a shell body of the support base where an anti-rebound frame can be assembled.

Referring to FIG. 3, the anti-rebound frame 130 can also be connected with a biasing spring 144. The biasing spring 144 can have two ends respectively connected with the shell body 114 and the anti-rebound frame 130. The spring 144 can bias the anti-rebound frame 130 downward for facilitating recline adjustment.

Figure 4:
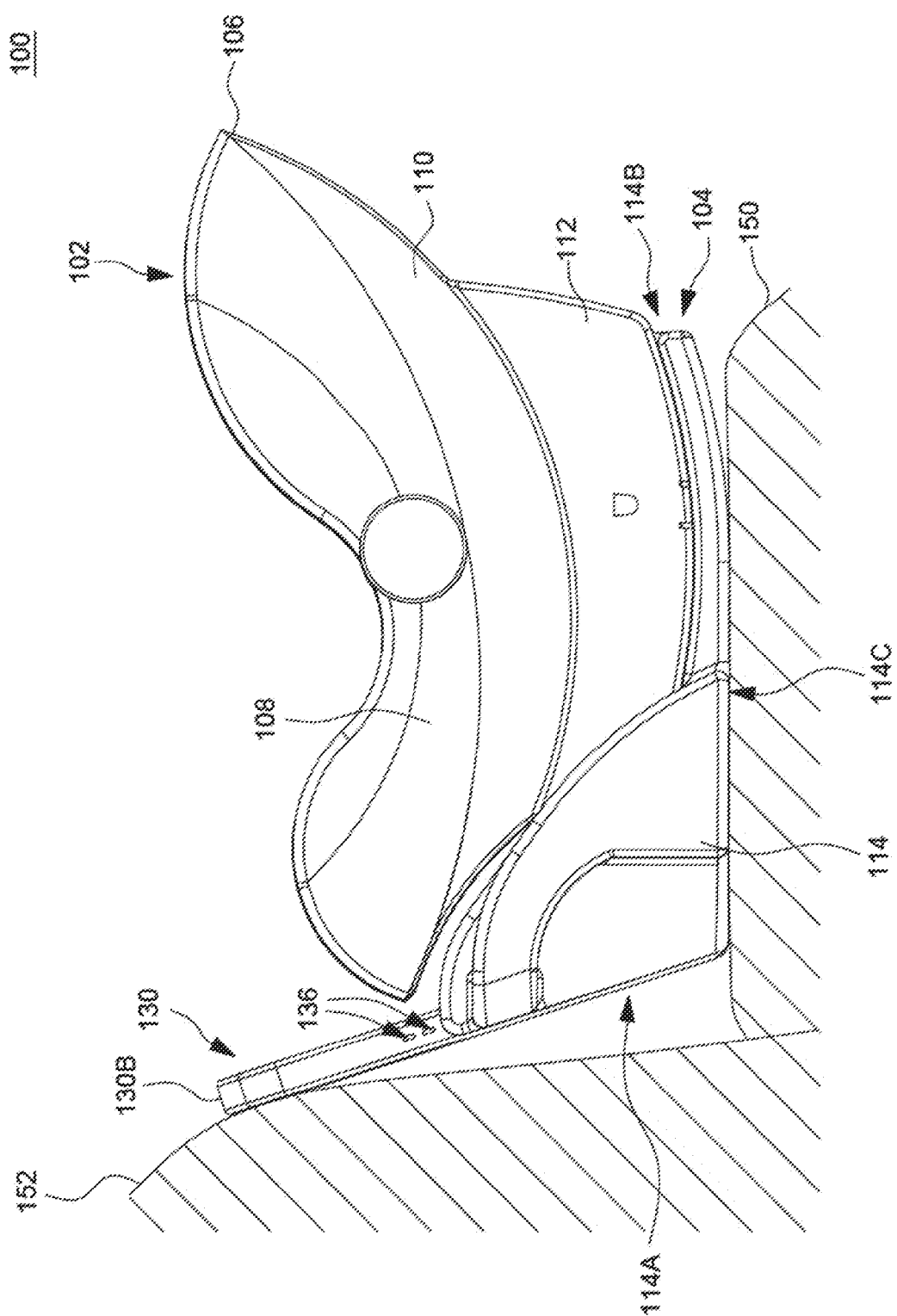
FIG. 4 is a schematic view illustrating the child safety seat assembly shown in FIG. 1 installed on a vehicle seat in a rearward facing position.

In conjunction with FIGS. 1-3, FIGS. 4 and 5 are schematic views illustrating exemplary operation of the anti-rebound frame 130. In FIG. 4, the child safety seat assembly 100 is shown as being installed on a vehicle seat 150 in a rearward facing position. Moreover, the latches 138 can be engaged with the locking openings 136 to lock the anti-rebound frame 130 with the shell body 114. In the configuration shown in FIG. 4, the upper end 130B of the anti-rebound frame 130 can extend upward past the upper surface 114D of the shell body 114, and the lower end 130C of the anti-rebound frame 130 can lie adjacent to the bottom surface 114C of the shell body 114 (e.g., the lower end 130C can be substantially leveled with the bottom surface 114C of the shell body 114). Accordingly, the support base 104 can lie in a substantially horizontal position stably supported by the bottom surface 114C, and the anti-rebound frame 130 can abut against a seatback 152 of the vehicle seat 150 to prevent rebound of the child safety seat assembly 100 against the seatback 152 when a collision occurs.

Figure 5:
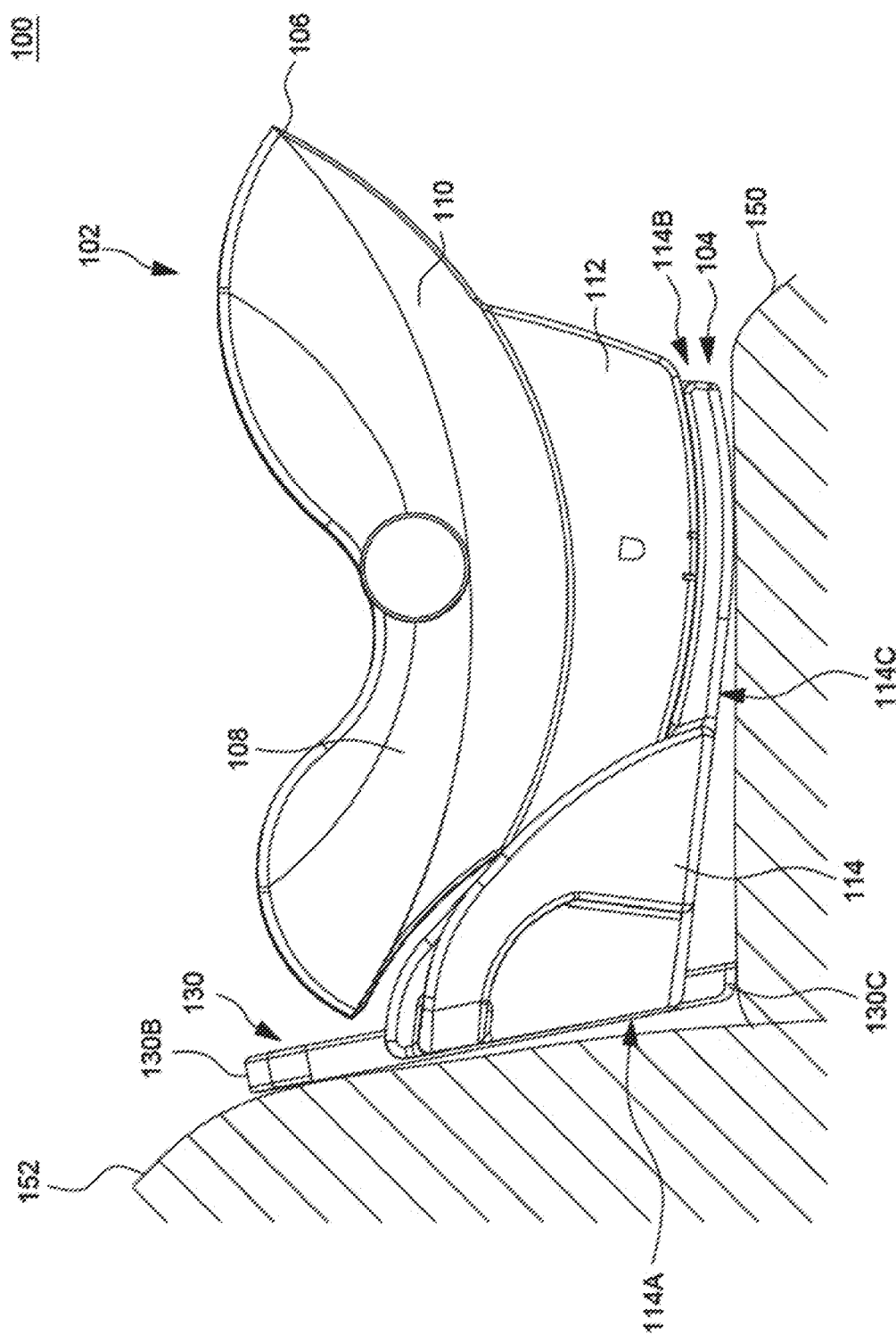
FIG. 5 is a schematic view illustrating the child safety seat assembly of FIG. 1 in a recline position.

In FIG. 5, the child safety seat assembly 100 is shown in a recline configuration. For switching the child safety seat assembly 100 from the horizontal position shown in FIG. 4 to the recline configuration shown in FIG. 5, the latches 138 can be displaced transversally to disengage and unlock from the anti-rebound frame 130. Then the anti-rebound frame 130 can slide vertically downward so that the lower end 130C extends downward past the bottom surface 114C. Downward displacement of the anti-rebound frame 130 can be facilitated by the downward biasing action applied by the spring 144 on the anti-rebound frame 130. As a result, the lower end 130C of the anti-rebound frame 130 can abut against the support surface of the vehicle seat 150 and cause an angular displacement of the end 114A relative to the other end 114B of the shell body 114 to recline the child safety seat assembly 100. In this recline configuration, the upper end 130B of the anti-rebound frame 130 extends upward past the upper surface 114D of the shell body 114, and the lower end 130C of the anti-rebound frame 130 extends downward past the bottom surface 114C of the shell body 114. Accordingly, the anti-rebound frame 130 can allow recline adjustment, and at the same time provides effective abutment against the seatback of the vehicle seat to prevent rebound displacement when a collision occurs.

When the caregiver wants to adjust the child safety seat assembly 100 the recline configuration shown in FIG. 5 back to the horizontal position shown in FIG. 4, the latches 138 can be displaced transversally to disengage and unlock the anti-rebound frame 130, and the shell body 114 of the support base 104 then can be pushed downward against the biasing action of the spring 144 to cause the lower end 130C of the anti-rebound frame 130 to move toward the interior of the shell body 114.

Figure 6:
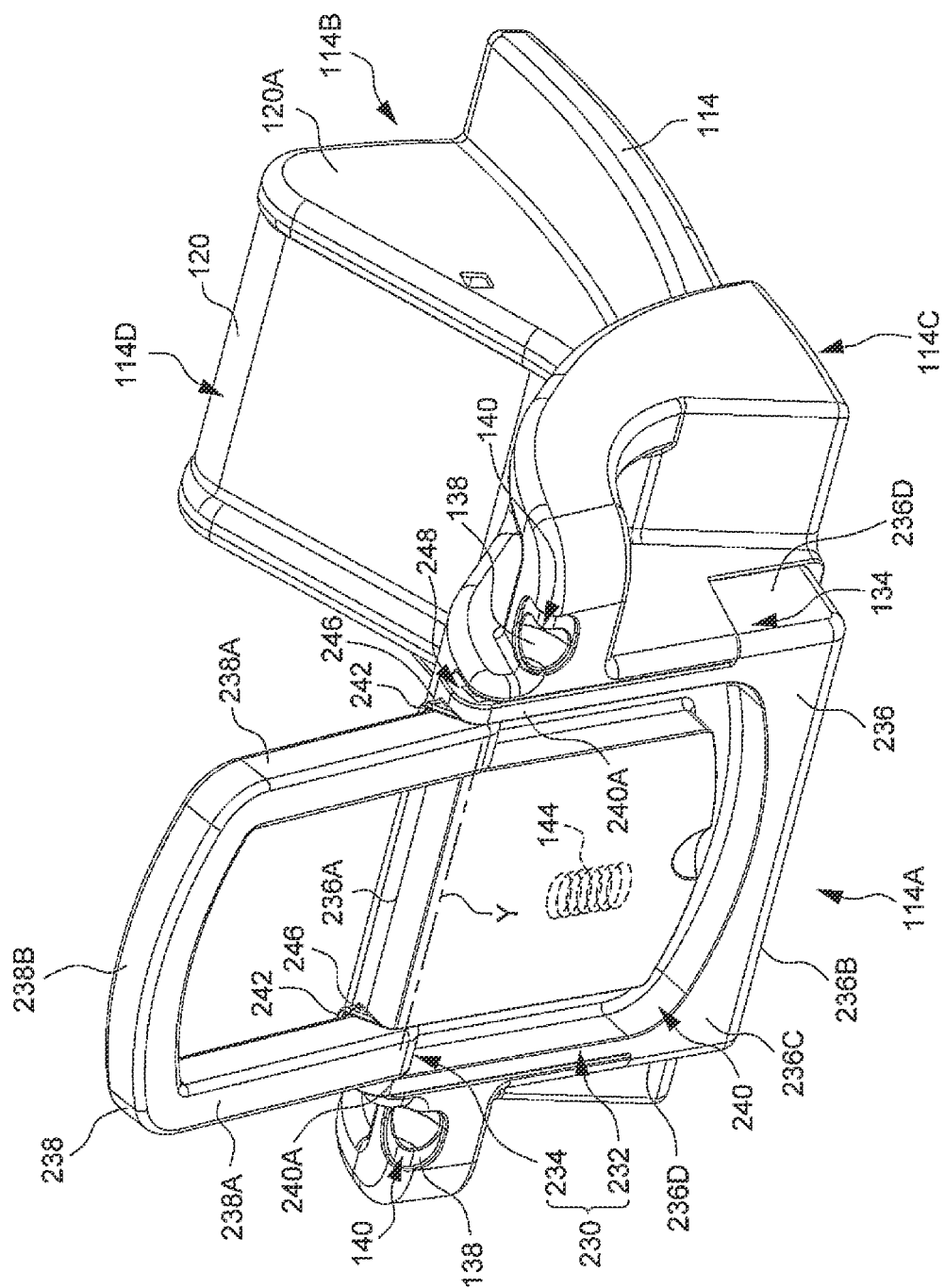
FIG. 6 is a schematic view illustrating another anti-rebound frame that may be assembled with a support base of the child safety seat assembly.

FIG. 6 is a schematic view illustrating another anti-rebound frame 230 that may be assembled with the support base 104. The anti-rebound frame 230 can include a first and a second part 232 and 234 connected with and movable relative to each other. In this embodiment, the first part 232 can be a panel 236, and the second part 234 can be a bar extension 238.

The panel 236 can have an upper edge 236A and a lower edge 236B, the lower edge 236B of the panel 236 defining a lower end of the anti-rebound frame 230. The panel 236 can be assembled with the shell body 114 through the channel 134 provided at the end 114A of the shell body 114. The channel 134 can guide the panel 236 to slide upward and downward relative to the shell body 114 between at least a first position where the lower edge 236B of the panel 236 can lie adjacent to the bottom surface 114C of the shell body 114, and a second position where the lower edge 236B can extend downward past the bottom surface 114C. Moreover, the panel 236 can have an outer surface 236C formed with a cavity 240 for receiving the bar extension 238.

The bar extension 238 can exemplary have a U-shape including two side segments 238A, and a transverse segment 238B connected with the two side segments 238A. The transverse segment 238B can define an upper end of the anti-rebound frame 230. The two side segments 238A can be pivotally connected with the shell body 114 adjacent to inner sidewalls 240A of the cavity 240. Accordingly, the bar extension 238 can be pivotally assembled with the panel 236 about a pivot axis Y extending transversally relative to the shell body 114. In one embodiment, the pivot connection of the bar extension 238 with the panel 236 can be located near the upper edge 236A of the panel 236. Through this pivotal connection, the bar extension 238 can be adjustable relative to the panel 236 between a first state where the bar extension 238 is deployed upward past the upper edge 236A of the panel 236, and a second state where the bar extension 238 is stowed toward the shell body 114 into the cavity 240 of the panel 236. The panel 236 can also include stop surfaces 242 to block rotation of the bar extension 238 beyond the deployed state, and thereby prevent the bar extension 238 from falling toward the upper surface 114D of the shell body 114.

In some embodiment, a locking mechanism may be optionally provided for holding the bar extension 238 in the deployed state. For example, the upper edge 236A of the panel 236 can include projecting tabs 246, and the bar extension 238 when in the deployed state can be in interference fit with the tabs 246, which can thereby holds the bar extension 238 in the deployed state. Other locking mechanisms such as movable latches may also be provided to hold the bar extension 238 in the desired state. Moreover, similar locking mechanisms may also be provided to hold the bar extension 238 in the storage state stowed in the cavity 240 of the panel 236.

Like previously described, the latches 138 can be provided for locking the anti-rebound frame 230 in place. The two latches 138 can be respectively assembled with the shell body 114 adjacent to the two sidewalls 134A of the channel 134, and can engage with any of a plurality of locking openings 248 formed on a left and a right side surface 236D of the panel 236. The latches 138 can thereby lock the panel 236 with the shell body 114 at any of a plurality of vertical positions.

Moreover, the anti-rebound frame 230 can also be connected with a biasing spring 144 (shown with phantom lines) operable to bias the anti-rebound frame 230 downward. The biasing spring 144 can have two ends respectively connected with the shell body 114 and the panel 236 of the anti-rebound frame 130. The spring 144 can apply a biasing force to urge the panel 236 downward for having the lower end 236B extending downward past the bottom surface 114C.

Figure 7:
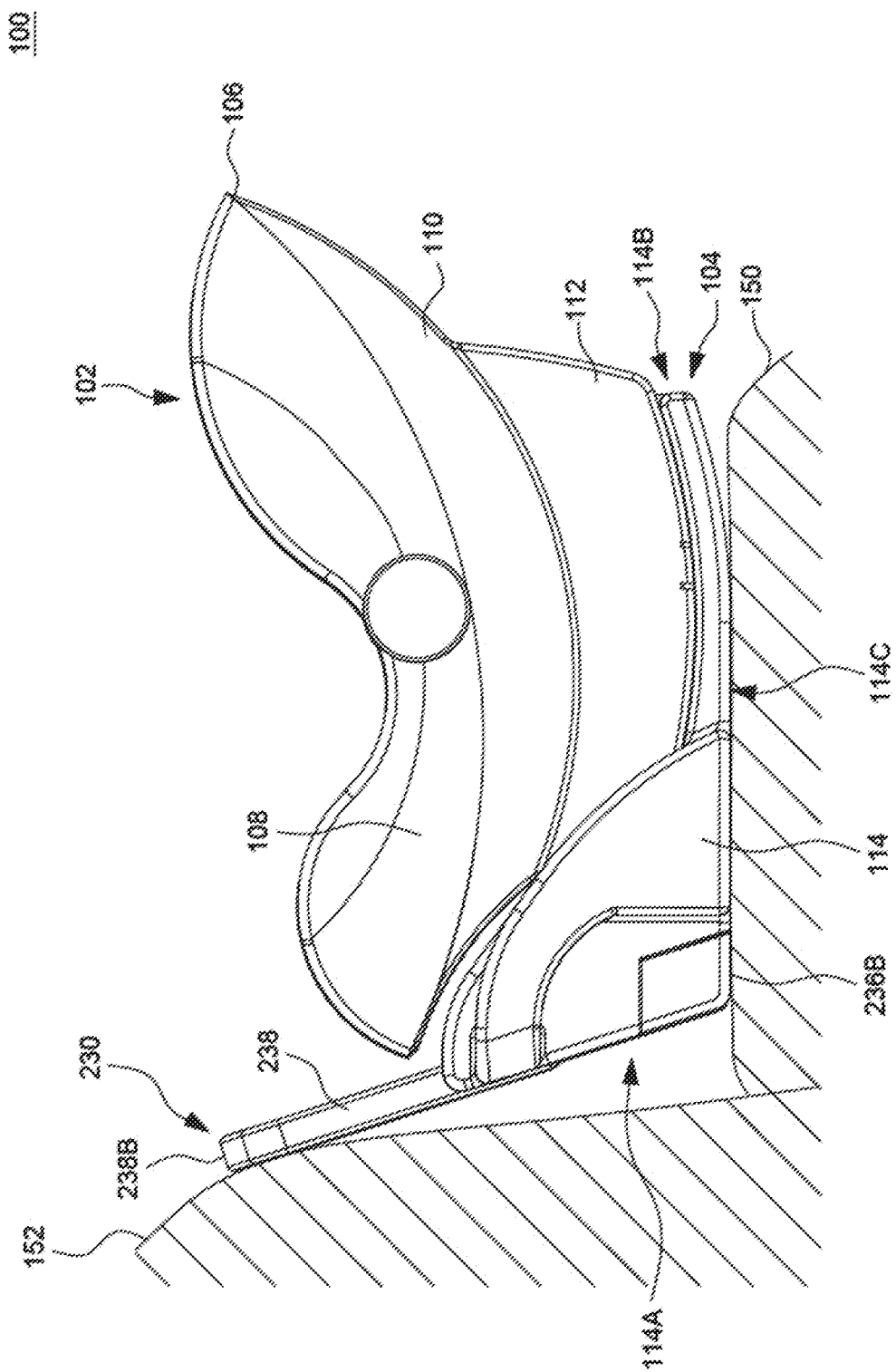
FIG. 7 is a schematic view illustrating the child safety seat assembly with the anti-rebound frame shown in FIG. 6 in a deployed state.

In conjunction with FIG. 6, FIGS. 7-10 are schematic views illustrating exemplary operation of the anti-rebound frame 230. In FIG. 7, the support base 104 is shown in a configuration in which the bar extension 238 is deployed upward past the upper edge 236A of the panel 236. In the deployed configuration, the bar extension 238 can extend substantially along the same direction as the panel 236. Moreover, the latches 138 can be engaged with the panel 236 to lock the anti-rebound frame 230 with the shell body 114. The upper end of the bar extension 238 defining the upper end of the anti-rebound frame 230 can thereby extend upward past the upper surface 114D of the shell body 114, and the lower edge 236B of the panel 236 defining the lower end of the anti-rebound frame 230 can lie adjacent to the bottom surface 114C of the shell body 114. Accordingly, the support base 104 can lie in a substantially horizontal position stably supported by the bottom surface 114C, and the anti-rebound frame 230 can abut against the seatback 152 of the vehicle seat 150 to prevent rebound of the child safety seat assembly 100 against the seatback 152 when a collision occurs.

Figure 8:
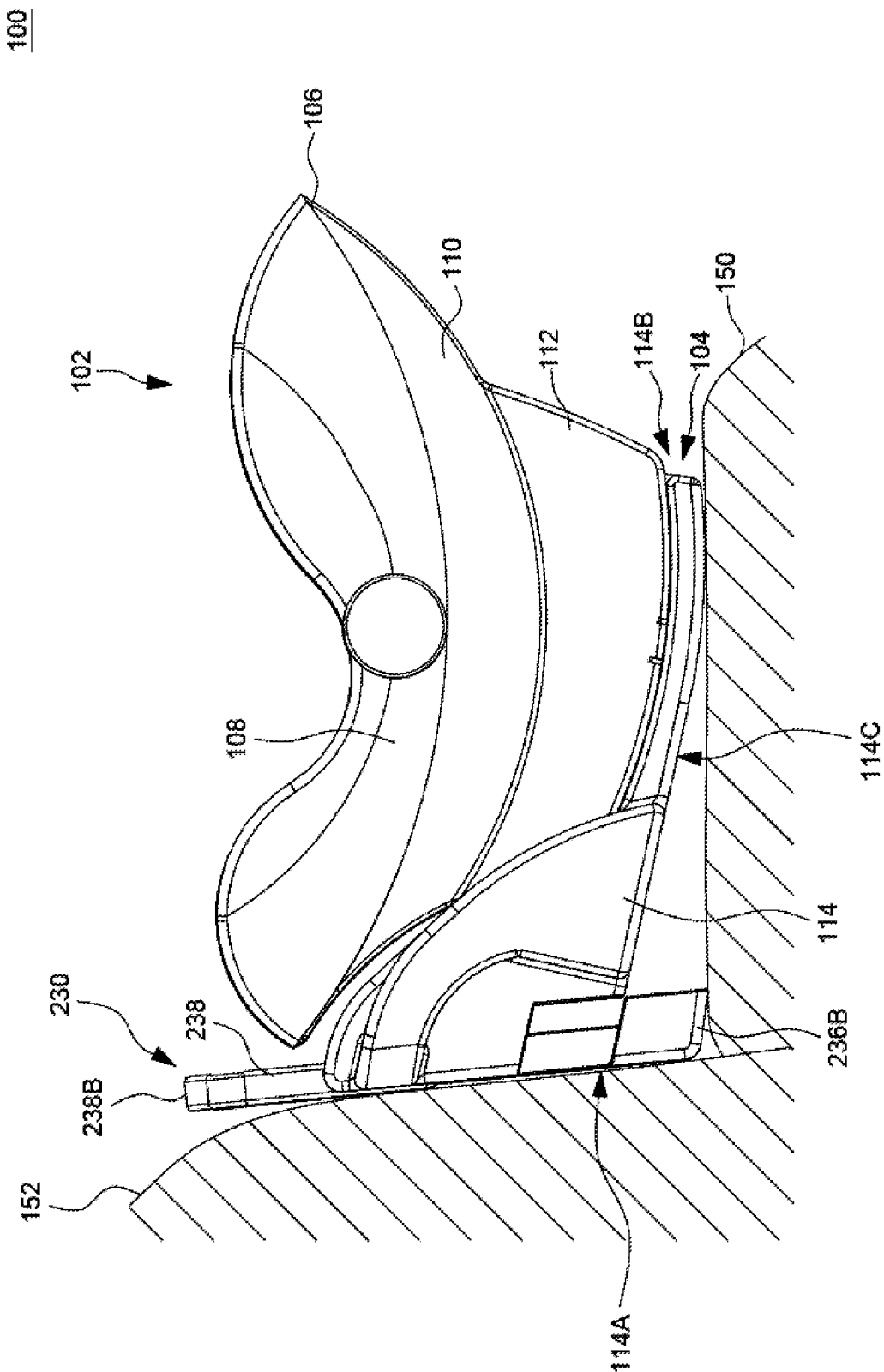
FIG. 8 is a schematic view illustrating the child safety seat assembly with the anti-rebound frame shown in FIG. 6 adjusted to a recline configuration.
Figure 9:
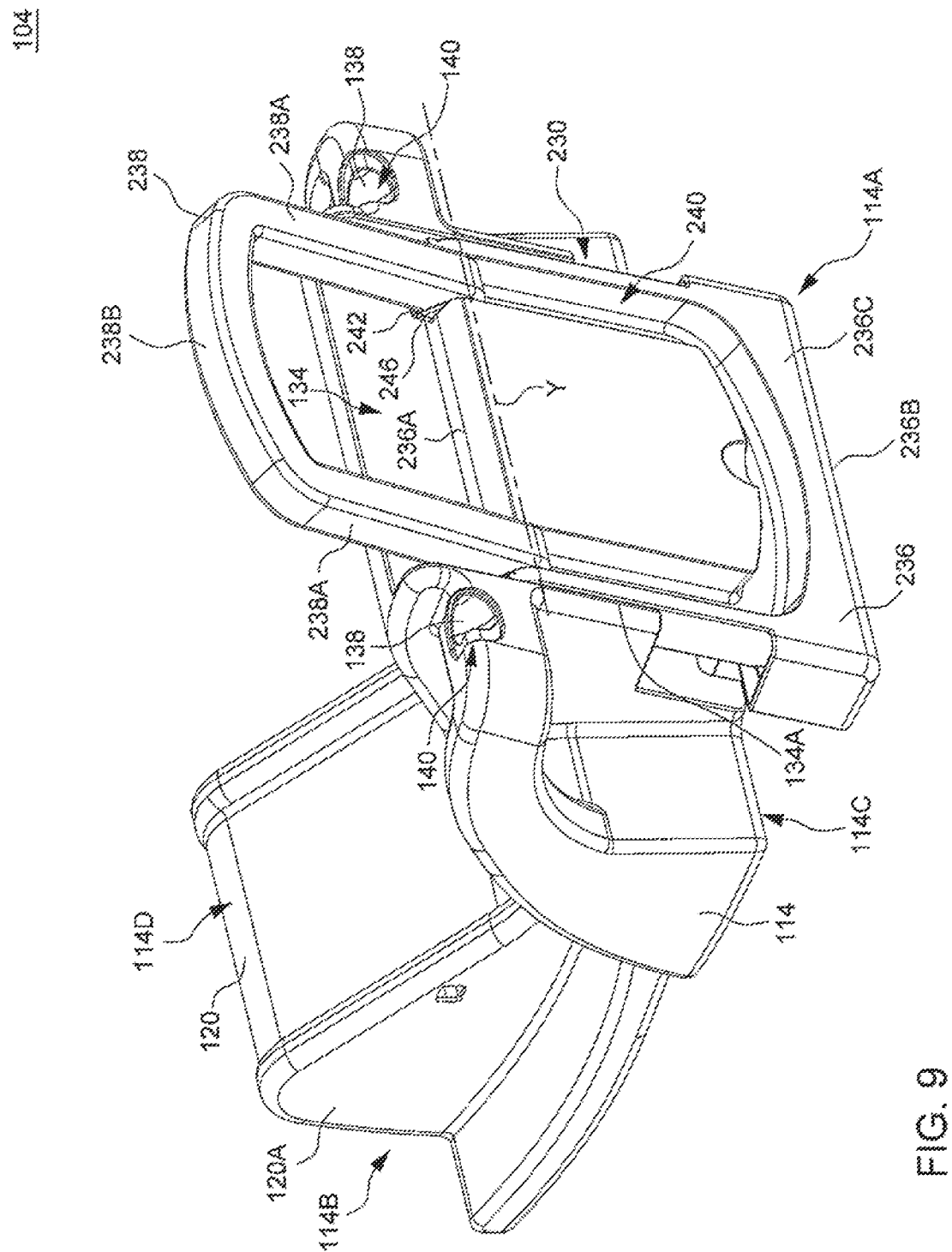
FIG. 9 is a perspective view illustrating the support base with the anti-rebound frame shown in FIG. 6 adjusted to a recline configuration.

In FIGS. 8 and 9, the support base 104 is shown in a recline configuration. For switching the child safety seat assembly 100 to the recline configuration, the latches 138 can be displaced transversally to disengage and unlock from the panel 236, which can unlock the anti-rebound frame 230. The anti-rebound frame 230 (including the panel 236 and the bar extension 238) can then slide vertically downward so that the lower edge 236B of the panel 236 extends downward past the bottom surface 114C. Meanwhile, the bar extension 238 can remain in the deployed state so that the upper end thereof (i.e., defined by the transverse segment 238B) can still extend upward past the upper edge 236A of the panel 236 and the upper surface 114D of the shell body 114. As a result, the lower end of the anti-rebound frame 230 defined by the lower edge 236B of the panel 236 can abut against the support surface of the vehicle seat 150 and cause an angular displacement of the end 114A relative to the other end 114B of the shell body 114 to recline the support base 104. In this recline configuration, the upper end of the anti-rebound frame 230 can extend upward past the upper surface 114D of the shell body 114 to provide effective protection against rebound, and the lower end of the anti-rebound frame 230 can extend downward past the bottom surface 114C of the shell body 114.

Figure 10:
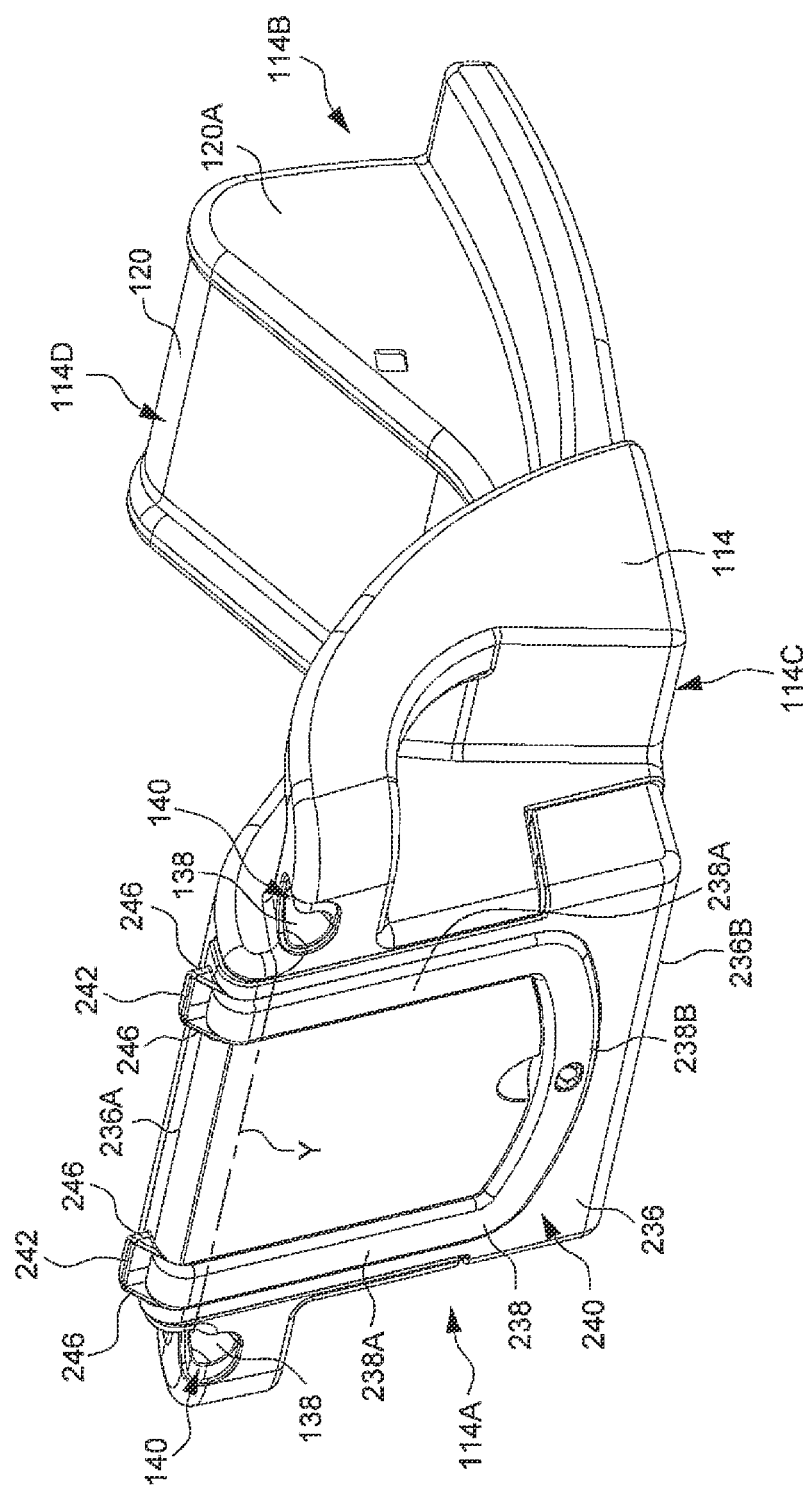
FIG. 10 is a schematic view illustrating the support base with the anti-rebound frame shown in FIG. 6 in a collapsed configuration.

In FIG. 10, the anti-rebound frame 230 is shown in a collapsed configuration. When the support base 104 is unused, the bar extension 238 can be rotated about the pivot axis Y toward the outer surface 236C of the panel 236, until the bar extension 238 is stowed in the cavity 240 of the panel 236. In the stowed position, the side segments 238A and the transverse segment 238B of the bar extension 238 can be received in the cavity 240. The overall size of the support base 104 can be thereby reduced for facilitating its storage and reducing the shipping cube and cost.

Figure 11:
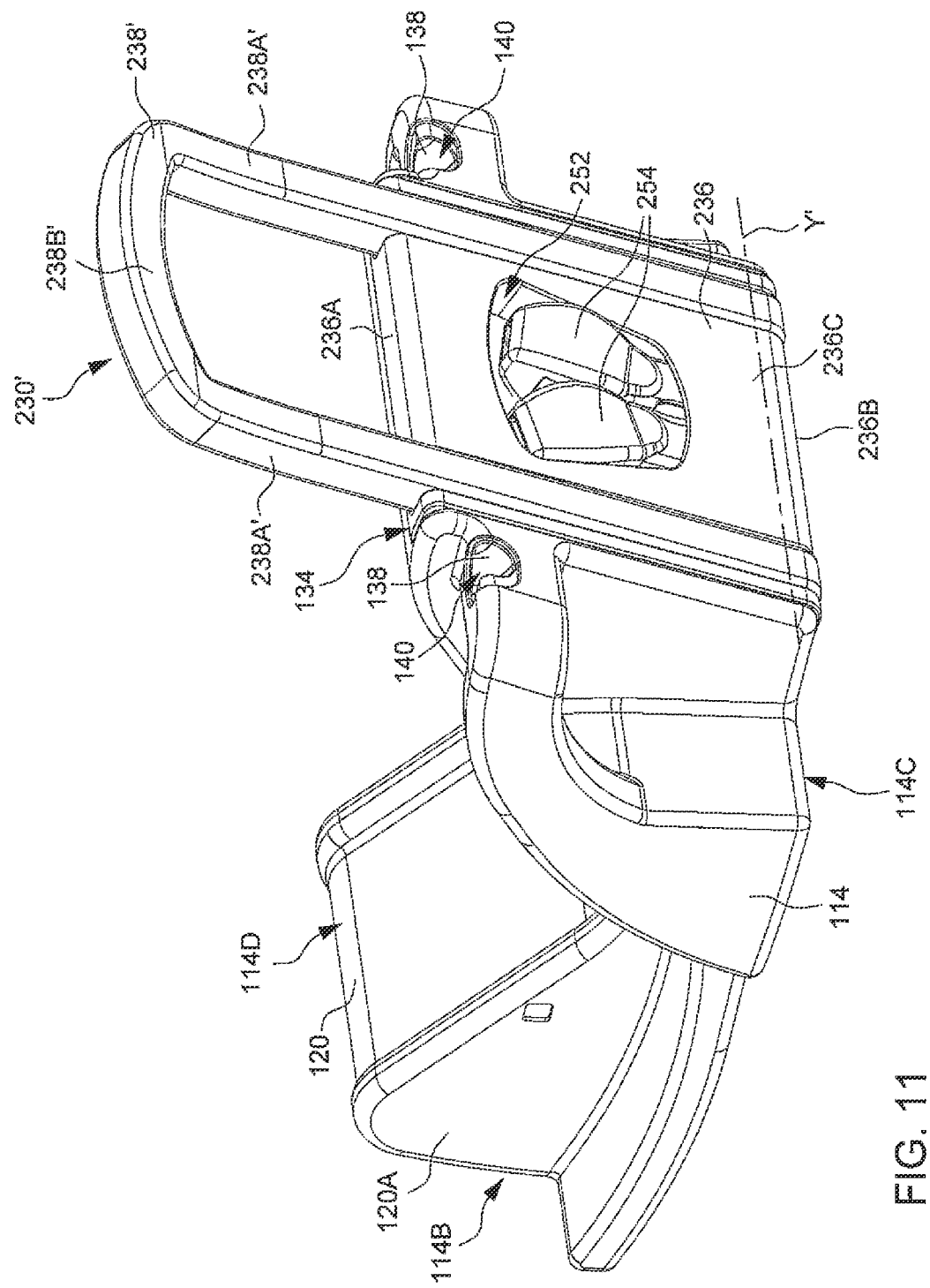
FIG. 11 is a schematic view illustrating another embodiment of an anti-rebound frame assembled with the support base.
Figure 12:
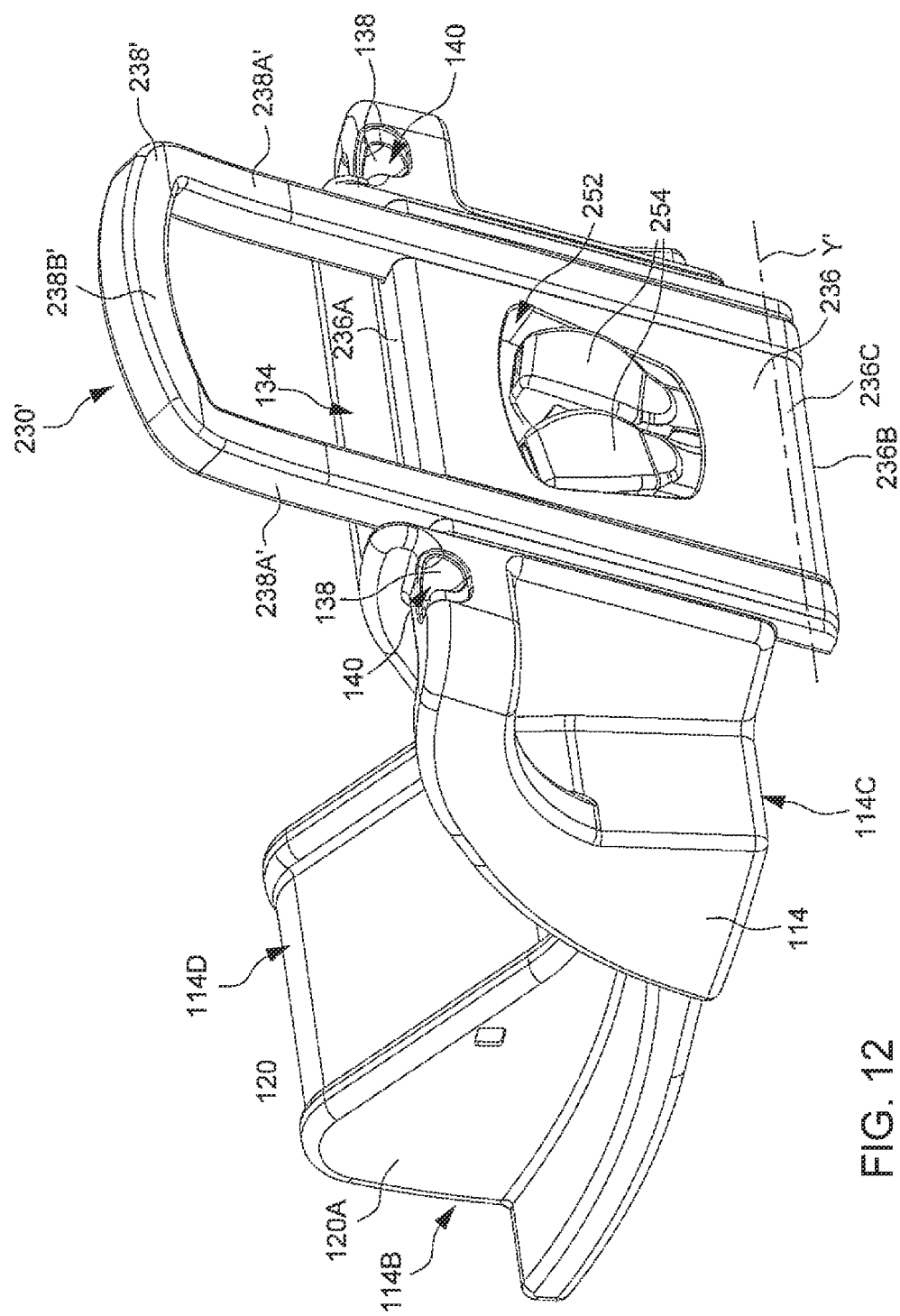
FIG. 12 is a schematic view illustrating the anti-rebound frame shown in FIG. 11 adjusted to a position to recline the support base.

FIGS. 11 and 12 are schematic views illustrating another embodiment of an anti-rebound frame 230' assembled with the support base 104. The anti-rebound frame 230' can be similar to the anti-rebound frame 230 described previously, and can include the panel 236 assembled with the shell body 114 for vertical sliding displacement, and a bar extension 238' pivotally connected with the panel 236. The bar extension 238' can include two side segments 238A', and a transverse segment 238B' connected with the two side segments 238A'. Compared to the previous embodiment, a difference of the anti-rebound frame 230' lies in the pivot connection of the bar extension 238' with the panel 236 which is disposed near the lower edge 236B of the panel 236. The side segments 238A' of the bar extension 238' can have a length that is longer than the length of the panel 236. Moreover, the bottom surface 114C of the shell body 114 can include a cavity 250 (better shown in FIG. 13) adapted to receive the bar extension 238'. The outer surface 236C of the panel 236 can also include a pocket 252 for storing lower anchor fasteners 254 used for restraining the support base 104 on a vehicle seat.

As shown in FIG. 11, like the embodiments previously described, the anti-rebound frame 230' can extend upward past the upper surface 114D of the shell body 114 to provide effective abutment against the seatback of the vehicle seat, while the lower end of the anti-rebound frame 230' (i.e., defined by the lower edge 236B of the panel 236) can lie adjacent to the bottom surface 114C of the shell body 114 so that the support base 104 can be placed in a horizontal position.

Referring to FIG. 12, the anti-rebound frame 230' can be adjusted so that the lower edge 236B of the panel 236 can extend downward past the bottom surface 114C to recline the support base 104.

Figure 13:
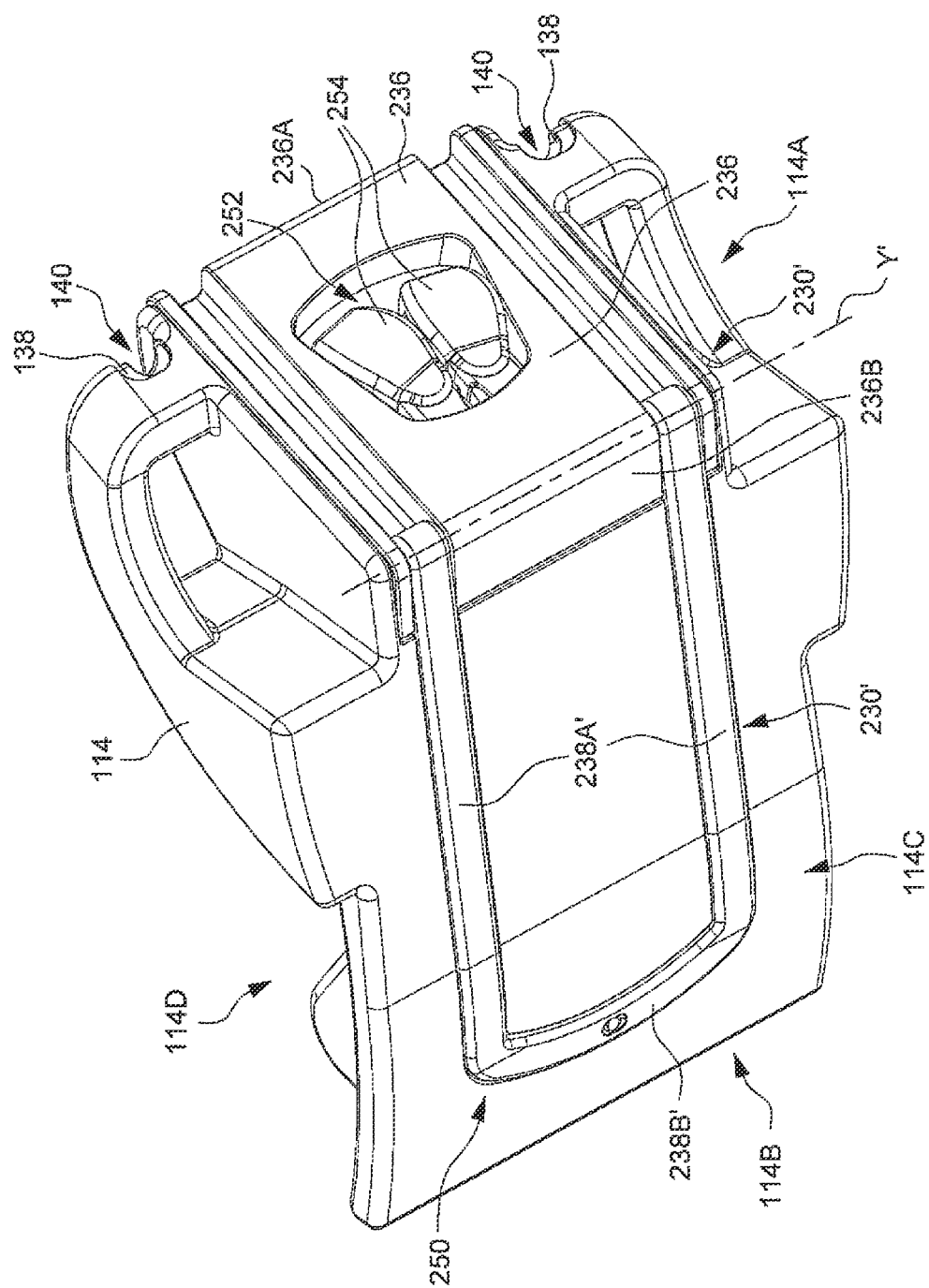
FIG. 13 is a schematic view illustrating the anti-rebound frame shown in FIG. 11 adjusted to a collapsed configuration.

As shown in FIG. 13, when the support base 104 is unused, the anti-rebound frame 230' can be collapsed by rotating the bar extension 238' about the pivot axis Y' toward the bottom surface 114C of the shell body 114. The bar extension 238' can be rotated until the bar extension 238' is stowed in the cavity 250 of the bottom surface 114C of the shell body 114. In the stowed position, the side segments 238A' and the transverse segment 238B' of the bar extension 238' can be received in the cavity 250. The overall size of the support base 104 can be thereby reduced for facilitating its storage.

Figure 14:
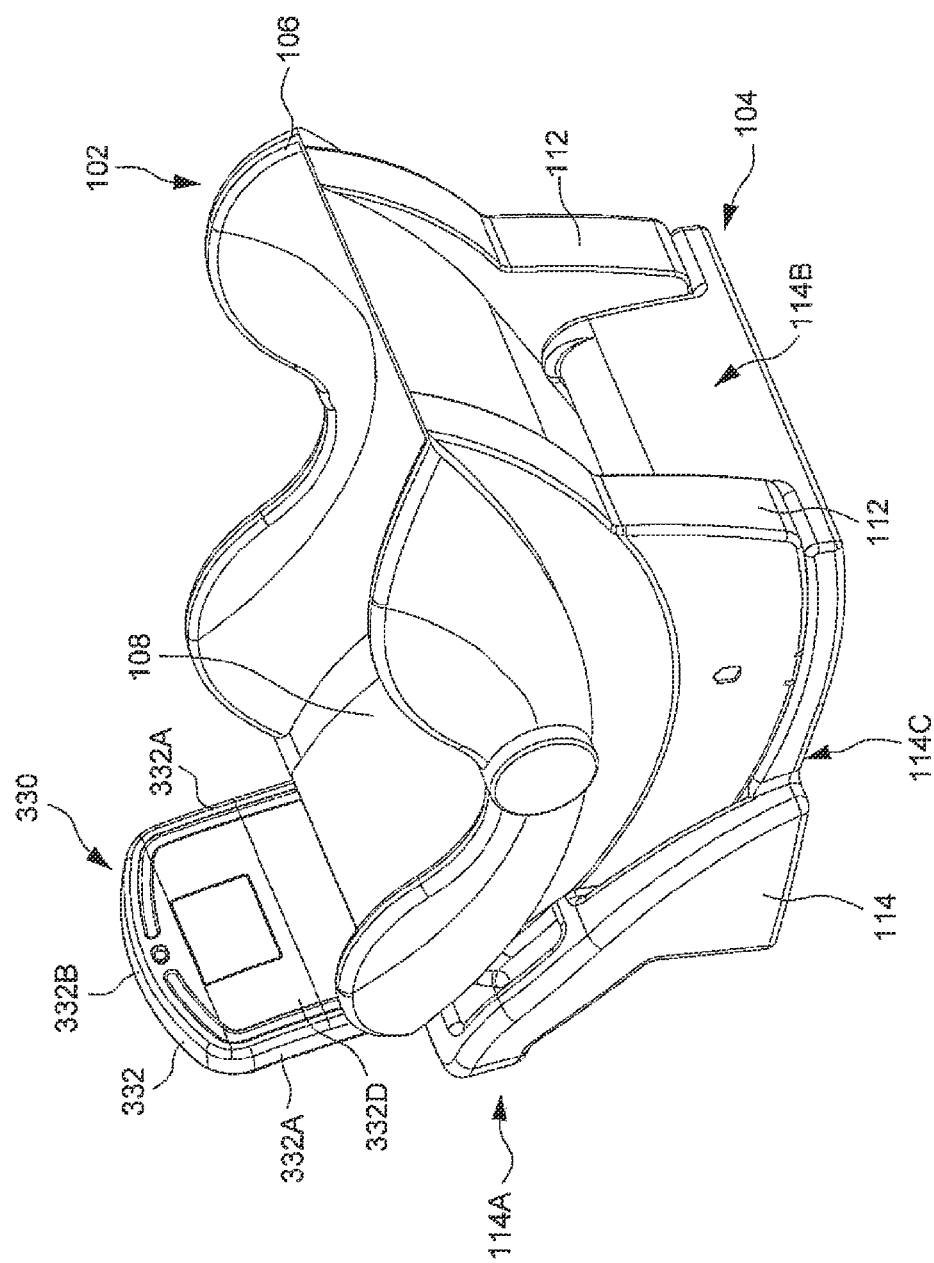
FIGS. 14 and 15 are schematic views illustrating another embodiment of an anti-rebound frame assembled with a support base of a child safety seat assembly.
Figure 15:
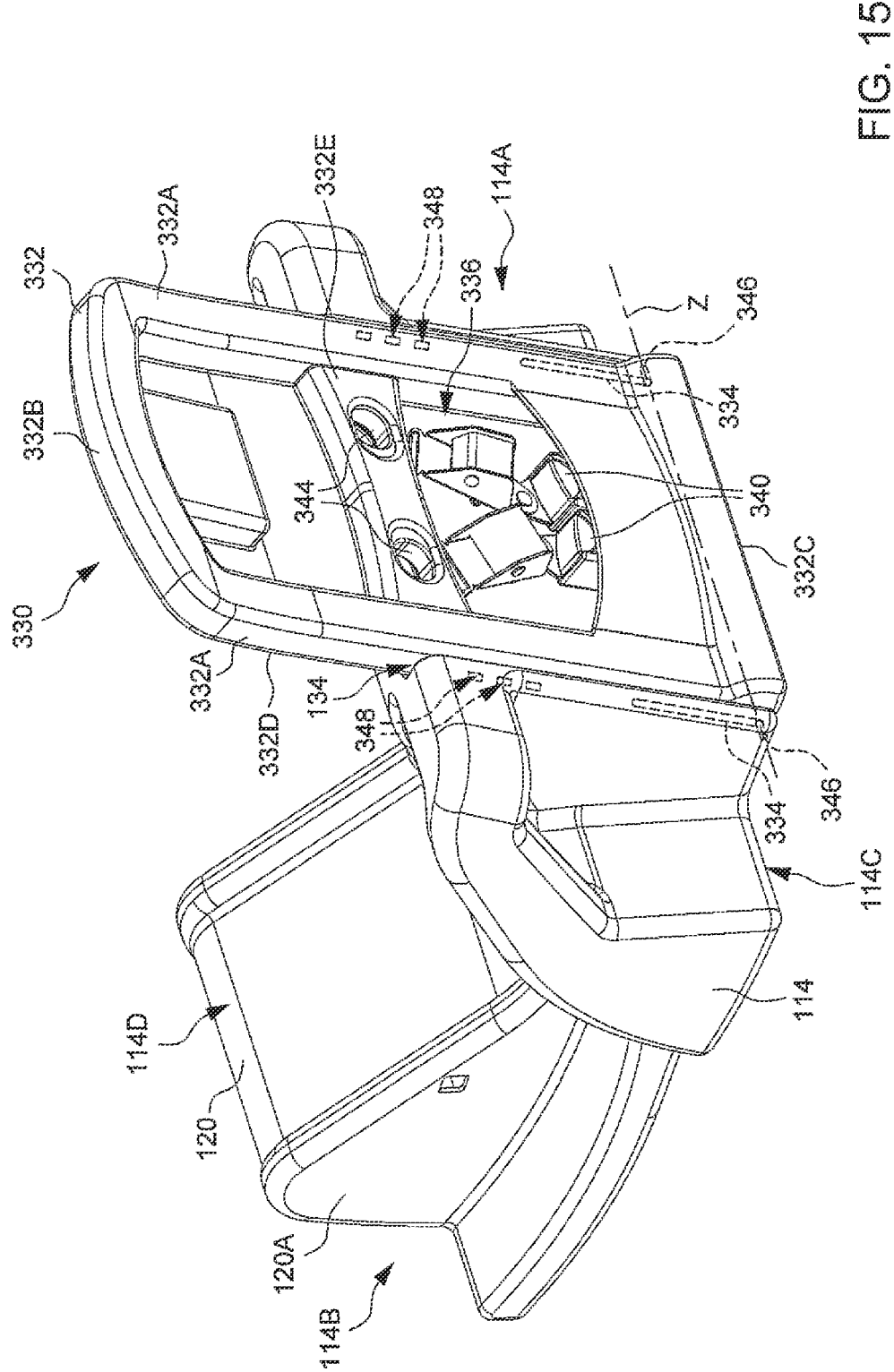

FIGS. 14 and 15 are schematic views illustrating another embodiment of an anti-rebound frame 330 that can assembled with the support base 104. The anti-rebound frame 330 can include a panel 332 that is assembled through the channel 134 provided at the end 114A of the shell body 114. The panel 332 can be formed as a unitary part including two side portions 332A respectively formed with parallel guide slots 334 (shown with phantom lines on FIG. 15), and an upper end 332B and a lower end 332C that are respectively connected with the two side portions 332A. The panel 332 can further have an inner surface 332D turned toward the child carrier 102 when the anti-rebound frame 330 is deployed, and an outer surface 332E opposite to the inner surface 332D having a pocket 336 for storage of lower anchor fasteners 340 used for restraining the support base 104 on a vehicle seat.

A plurality of latches 344 can be assembled with the panel 332 to lock the anti-rebound frame 330 with the shell body 114. The two latches 344 can be assembled with the panel 332 for transversal sliding displacement relative to the panel 332, and can respectively extend outward through the side portions 332A to engage with the shell body 114. Moreover, the latches 344 can be at least partially accessible from the opposite sides of the panel 332 for operation, i.e., on the outer surface 332E and the inner surface 332D (better shown in FIG. 16). In this embodiment, the latches 344 are thus assembled with the anti-rebound frame 330, and can be operable to lock the anti-rebound frame 330 in different positions relative to the shell body 114.

The channel 134 can have a lower end provided with shaft portions 346 (shown with phantom lines on FIG. 15) respectively protruding transversally from the two sidewalls 134A. The two sidewalls 134A can also respectively include a plurality of locking openings 348 through which the latches 344 can engage to lock the panel 332 in different positions in the channel 134. When the panel 332 is assembled with the shell body 114, the shaft portions 346 can respectively pass through the guide slots 334. The channel 134 can thereby guide the panel 332 to slide upward and downward relative to the shell body 114 between at least a first position where the lower end 332C lies adjacent to the bottom surface 114C of the shell body 114, and a second position where the lower end 332C can extend downward past the bottom surface 114C to recline the support base 104. When the lower end 332C of the panel 332 lies in a proper position adjacent to the bottom surface 114C of the shell body 114, the shaft portions 346 can further define a pivot axis Z extending transversally about which the panel 332 can rotate between a deployed state and a storage state.

Figure 16:
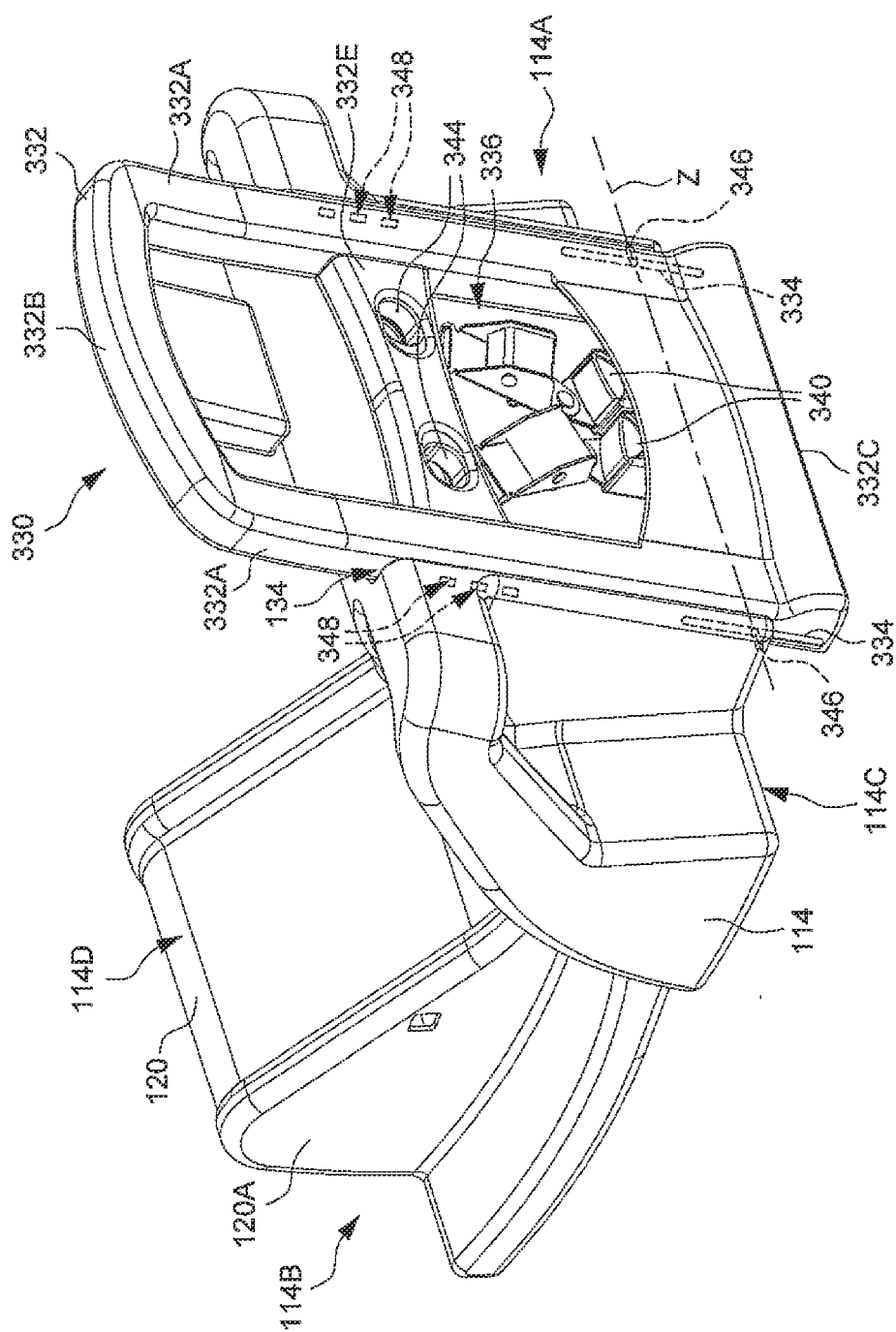
FIG. 16 is a schematic view illustrating the anti-rebound frame shown in FIGS. 14 and 15 adjusted to in a configuration for reclining the support base.
Figure 17:
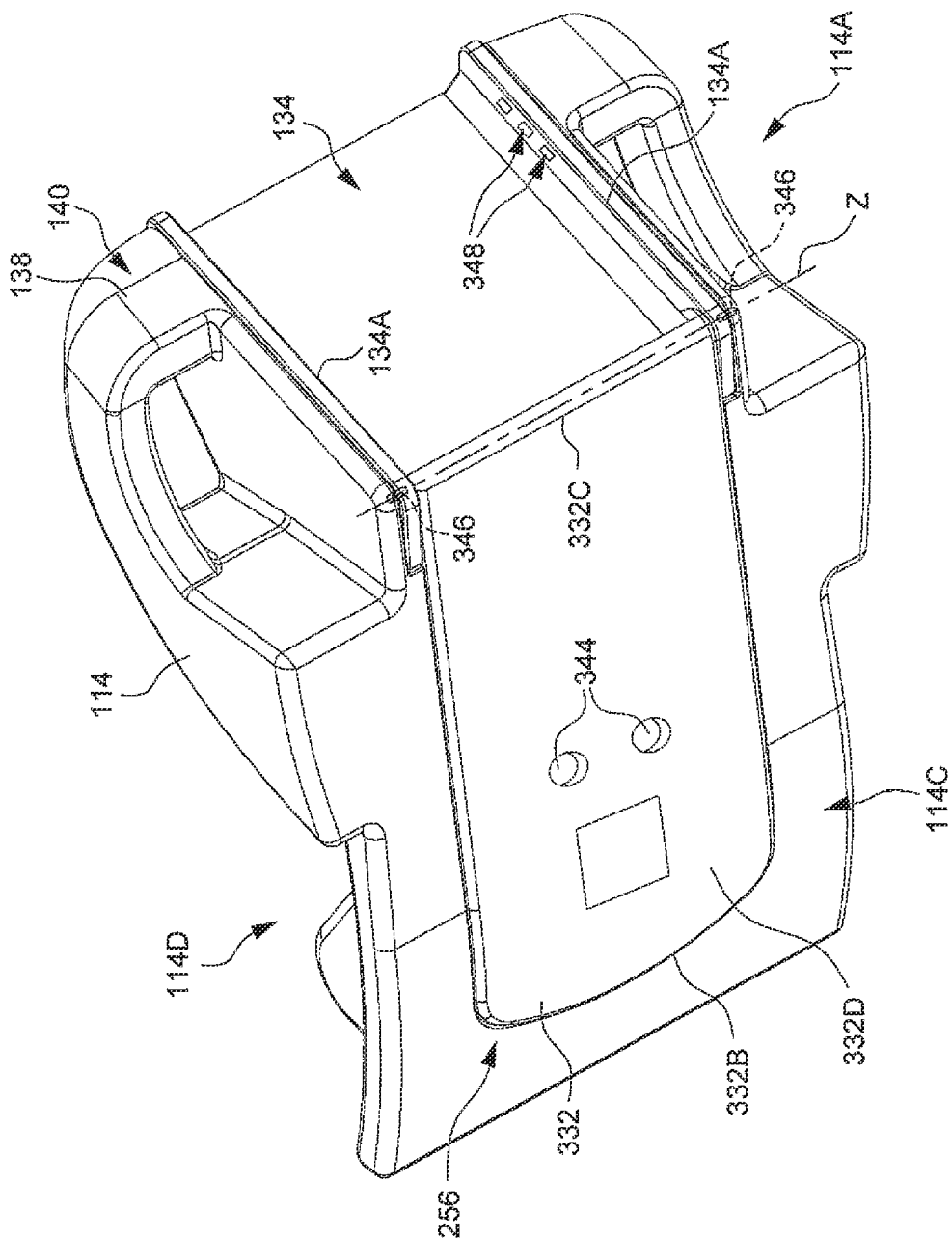
FIG. 17 is a schematic view illustrating the anti-rebound frame shown in FIGS. 14 and 15 in a collapsed state.

In conjunction with FIG. 15, FIGS. 16 and 17 are schematic views illustrating exemplary operation of the anti-rebound frame 330. In FIG. 15, the anti-rebound frame 330 is shown in the deployed state. The upper end 332B of the panel 332 defining the upper end of the anti-rebound frame 330 can extend upward past the upper surface 114D of the shell body 114, and the lower end 332C of the panel 332 defining the lower end of the anti-rebound frame 330 can lie adjacent to the bottom surface 114C of the shell body 114. In this deployed configuration, the support base 104 can lie in a substantially horizontal position, and the anti-rebound frame 330 can provide effective abutment against the seatback of the vehicle seat to prevent rebound displacement.

In FIG. 16, the anti-rebound frame 330 is shown in a configuration for reclining the support base 104. For reclining the support base 104, the latches 344 can be displaced toward each other to disengage from the sidewalls 134A of the shell body 114. The panel 332 then can slide downward to cause the lower end 332C to extend downward away from the shaft portions 346 and past the bottom surface 114C of the shell body 114. Once the support base 104 is in the desired recline position, the latches 344 can engage with the sidewalls 134A of the shell body 114 to lock the anti-rebound frame 330 in place. While the lower end 332C lies below the bottom surface 114C in the recline configuration, the upper end 332B can still remain above the upper surface 114D of the shell body 114 to provide effective abutment against the seatback of the vehicle seat.

Referring to FIG. 17, when the support base 104 is unused, the latches 344 can be unlocked, and the anti-rebound frame 330 can be collapsed by rotating the panel 332 about the pivot axis Z toward the bottom surface 114C of the shell body 114. The panel 332 may rotate about the pivot axis Z while the lower end 332C is kept adjacent to the shaft portions 346. The anti-rebound frame 330 can thereby flip down to stow in a cavity 256 formed on the bottom surface 114C of the shell body 114. When the anti-rebound frame 330 is received in the cavity 256, the inner surface 332D of the panel 332 can face downward whereas the outer surface 332E can face upward.

Figure 18:
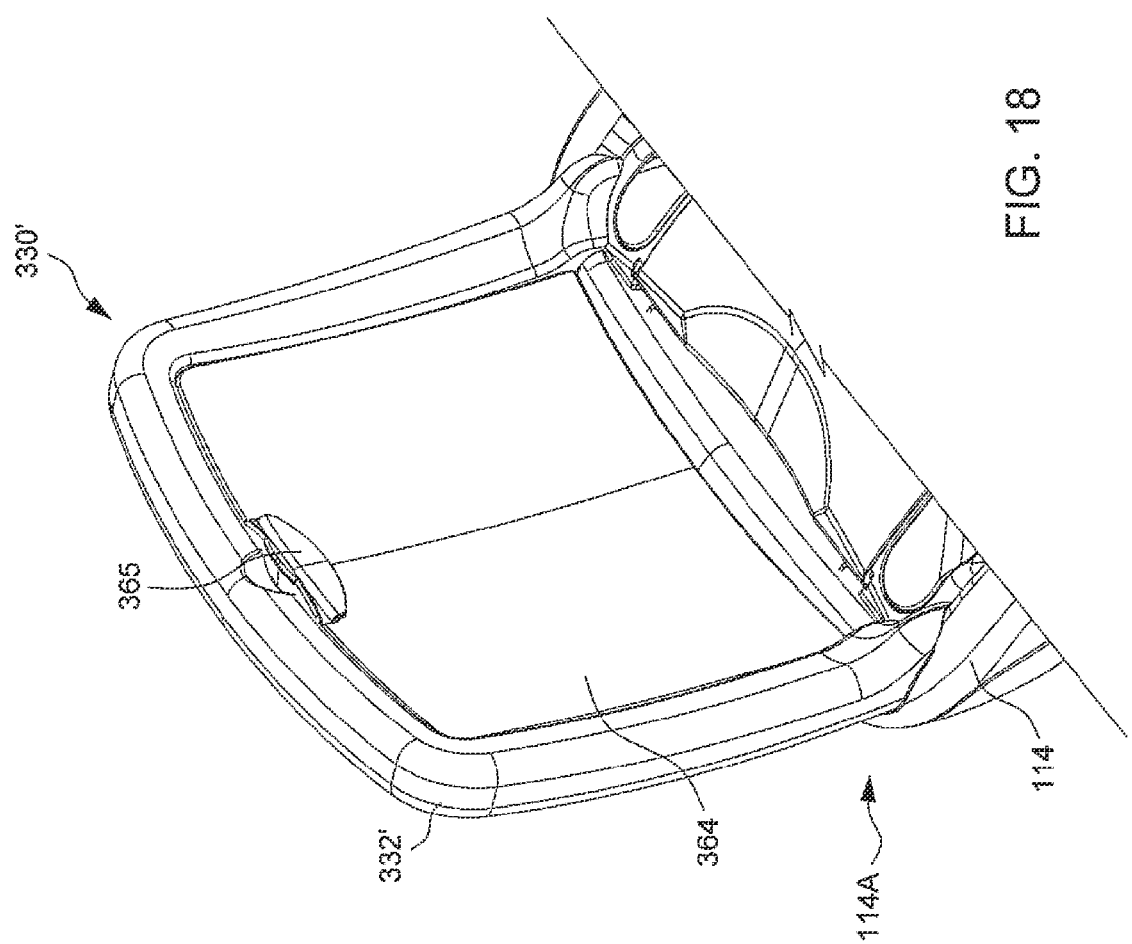
FIG. 18 is a schematic view illustrating a variant embodiment of an anti-rebound frame including a storage compartment for placement of a portable electronic device.
Figure 19:
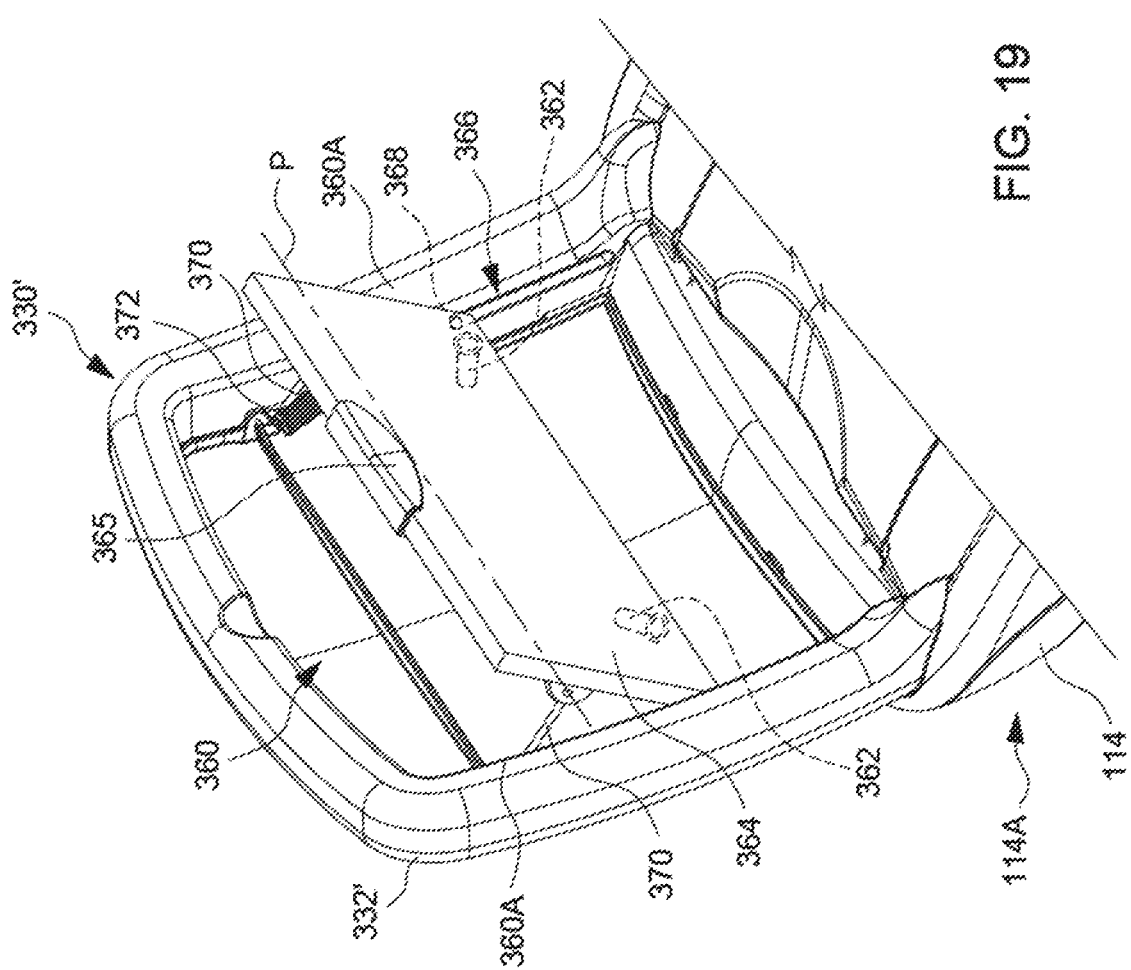
FIG. 19 is a schematic view illustrating the assembly of a movable door for closing and opening the storage compartment of the anti-rebound frame shown in FIG. 18.

FIGS. 18 and 19 are schematic views illustrating a variant embodiment of an anti-rebound frame 330' including a storage compartment for placement of portable electronic devices. Like previously described, the anti-rebound frame 330' can include a panel 332' that can provide effective abutment against the seatback of the vehicle seat. Moreover, the panel 332' can have an inner side in which is defined a receiving cavity 360 for docking a portable electronic device, e.g., a tablet computer or a smart phone, and the like, which may be used for entertainment or video monitoring of the child sitting on the child carrier. The receiving cavity 360 may be disposed in front of the child sitting on the child carrier. The receiving cavity 360 may be opened and closed by a movable door 364, and support members 362 (shown with phantom lines) may be affixed with an inner surface of the movable door 364 to provide support for the portable electronic device. In one embodiment, the door 364 may be made of a transparent material, such that the object or device arranged in the receiving cavity 360 can be visible through the door 364 to a child sitting on the child carrier.

For assembling the door 364 with the panel 332', a left and a right sidewall 360A of the receiving cavity 360 can respectively include elongated guide slots 366 along which two pins 368 protruding from two side edges of the door 364 can be respectively guided for upward and downward sliding displacement. Moreover, the door 364 can have a latch 365 that can engage with the panel 332' to lock the door 364 in a closing state.

Two linking arms 370 can also be provided to connect the door 364 with the two side edges of the panel 332'. Each of the linking arms 370 can have a first end pivotally connected with one sidewall 360A of the panel 332', and a second end pivotally connected with the door 364 about a pivot axis P extending transversally and offset from the pins 368.

One or more spring 372 can also be provided to bias the door 364 toward an open position as shown in FIG. 19. The spring 372 can have a first end anchored with the panel 332', and a second end anchored with the door 364 at a location eccentric from the pivot axis P.

When the door 364 is in the close state, the pins 368 can be displaced toward a lower end of the guide slots 366, and the latch 365 can engage with an upper rim of the receiving cavity 360 to lock the door 364 in place. For opening the door 364, the latch 365 can be manually operated to disengage from the panel 332'. As a result, the spring 372 can pull the door 364 to rotate about the pivot axis P while the pins 368 slide upward along the guide slots 366. The door 364 can thereby incline outward to open the receiving cavity 360, as shown in FIG. 19.

It will be understood that the aforementioned features associated with receiving cavity 360 for docking an electronic device in front of a child may be implemented with any of the anti-rebound frames described herein.

Figure 20:
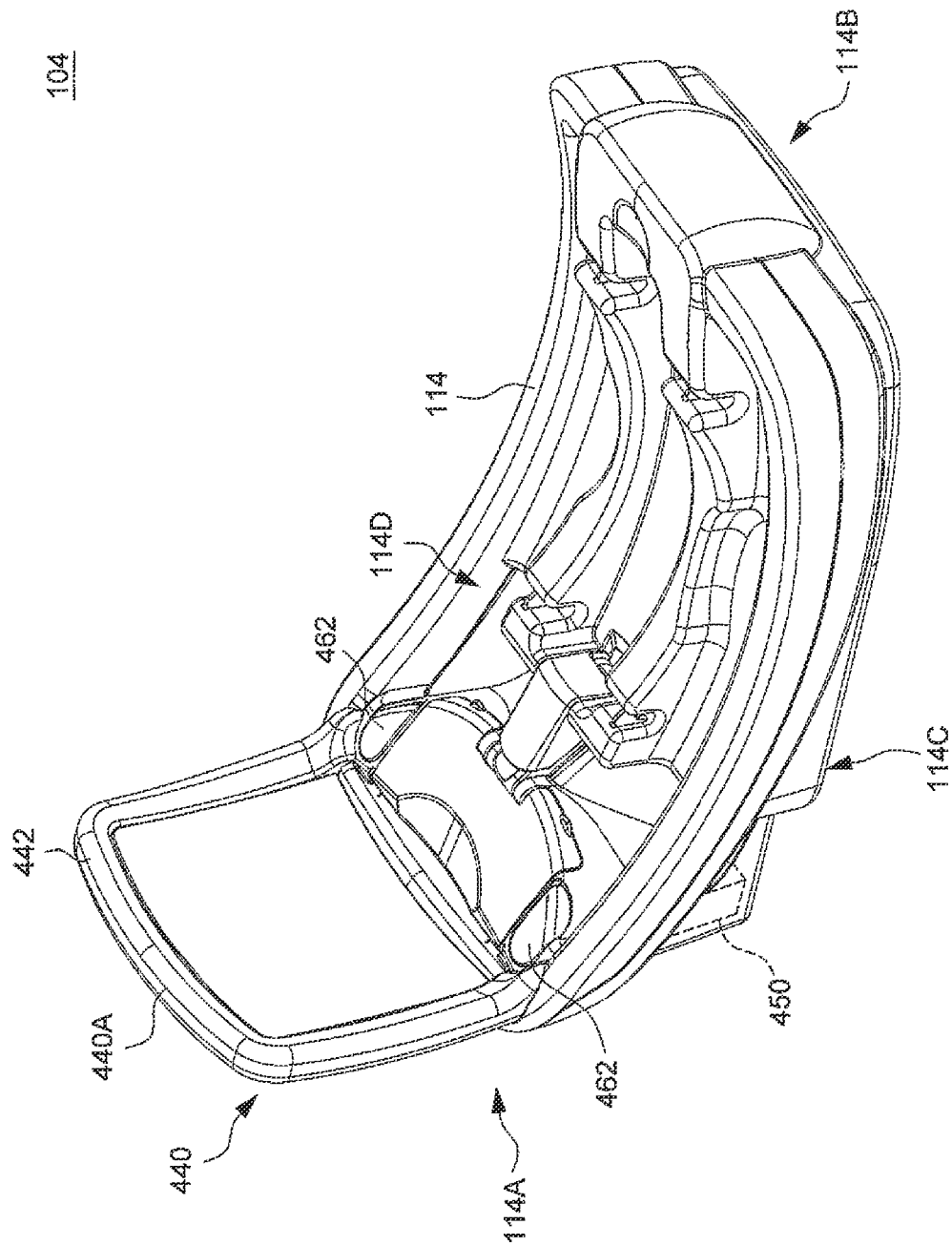
FIG. 20 is a schematic view illustrating another embodiment of a support base having an anti-rebound frame and recline adjustment.
Figure 21:
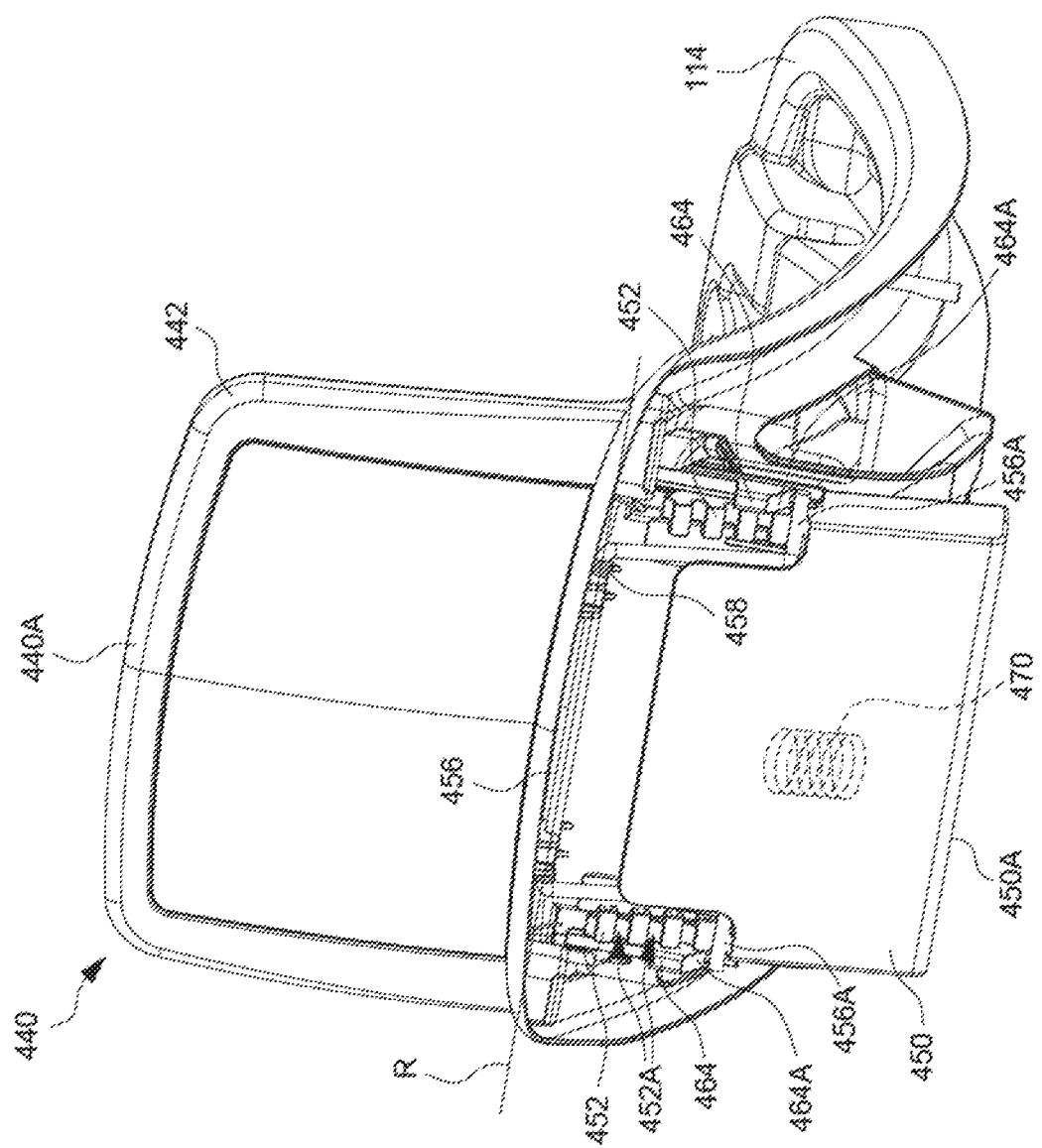
FIG. 21 is a schematic view illustrating an internal construction of the support base shown in FIG. 20.

FIGS. 20 and 21 are schematic views illustrating another embodiment of a support base 104 that has an anti-rebound frame 440 and recline adjustment capabilities. The anti-rebound frame 440 can be formed as a panel 442 that is affixed with the shell body 114 of the support base 104. The upper end 440A of the anti-rebound frame 440 can extend upward past the upper surface 114D of the shell body 114 so as to provide effective abutment against the seatback of a vehicle seat for preventing rebound displacement. The recline adjustment can be implemented by a recline foot 450 assembled at the end 114A of the shell body 114 below the anti-rebound frame 440.

FIG. 21 is a schematic view illustrating the assembly of the recline foot 450 in the shell body 114 of the support base 104. The recline foot 450 can have a lower end 450A, and two rack structures 452 parallel to each other arranged above the lower end 450A. A latching part 456 can be pivotally connected with the shell body 114 about a pivot axis R located above the recline foot 450. The latching part 456 can be formed as a bar having two extensions 456A that can respectively engage with the two rack structures 452 to lock the recline foot 450 in place. In particular, each of the extensions 456A can respectively engage with any of a plurality of locking recesses 452A provided on the corresponding rack structure 452. A spring 458 (e.g., torsion spring) can be assembled with the latching part 456 for biasing the latching part 456 into locking engagement with the rack structures 452.

A spring 470 (shown with phantom lines) may also be connected to the recline foot 450 for biasing the recline foot 450 downward. For example, the spring 470 can have two ends respectively connected with the shell body 114 and the recline foot 450.

Referring to FIGS. 20 and 21, the shell body 114 may also be assembled with two release buttons 462 operable to unlock the latching part 456. The two release buttons 462 can be exposed on the upper surface 114D of the shell body 114 adjacent to the anti-rebound frame 430, and can be respectively arranged near a left and right border of the shell body 114. Each of the two release buttons 462 can be formed to include a stem 464 that extends downward toward a corresponding extension 456A of the latching part 456 and has a ramp surface 464A.

When either of the release button 462 is depressed, the corresponding ramp surface 464A can be urged in contact against the corresponding extension 456A so as to push the latching part 456 to rotate in a direction for concurrently disengaging the two extensions 456A from the two rack structures 452. The unlocked recline foot 450 then can be vertically displaced by the spring 470 so that the lower end 450A extends downward past the bottom surface 114C to obtain a desirable recline angle. Once the desired recline angle is reached, the release button 462 can be released, and the latching part 456 can be biased by the spring 458 to engage with the rack structures 452 and thereby lock the recline foot 450 in place.

Advantages of the structures described herein include the ability to adjust an anti-rebound frame to provide compact storage and recline adjustment for the child safety seat assembly. As a result, the child safety seat assembly can have a more compact construction, lower shipping cost, and the anti-rebound frame can be conveniently operated to obtain the desired deployed, recline and storage configurations.

Realizations of the child safety seat assemblies have been described in the context of particular embodiments. These embodiments are meant to be illustrative and not limiting. Many variations, modifications, additions, and improvements are possible. These and other variations, modifications, additions, and improvements may fall within the scope of the inventions as defined in the claims that follow.

What is claimed is:

1. A support base for a child safety seat assembly, comprising:
a shell body having a bottom surface that supports the support base when resting on a support surface, and an upper surface for installing a child carrier, an end of the shell body being provided with a channel;
an anti-rebound frame assembled with the shell body and positionable at least partially in the channel of the shell body, the anti-rebound frame being movable up and down relative to the shell body to extend upward past the upper surface and to extend downward past the bottom surface; and
a latch operable to lock the anti-rebound frame with the shell body;
wherein the support base is installable on a vehicle seat with the end of the shell body placed adjacent to a seatback of the vehicle seat and the anti-rebound frame extending upward past the upper surface in abutment against the seatback, the support base being further installable on a vehicle seat with the end of the shell body placed adjacent to a seatback of the vehicle seat and the anti-rebound frame extending downward past the bottom surface to contact against the vehicle seat.

2. The support base according to claim 1, wherein the anti-rebound frame has a lower end, the lower end being movable between a first position adjacent to the bottom surface, and a second position extending downward past the bottom surface.

3. The support base according to claim 1, wherein the anti-rebound frame is connected with a spring, the spring biasing the anti-rebound frame downward.

4. The support base according to claim 1, wherein the anti-rebound frame has an upper end and a lower end, the anti-rebound frame being adjustable to a configuration in which the upper end extends upward past the upper surface and the lower end extends downward past the bottom surface.

5. The support base according to claim 4, wherein the anti-rebound frame including the upper and lower ends is integrally formed in one single body.

6. The support base according to claim 4, wherein the anti-rebound frame includes a first and a second part connected with and movable relative to each other, the lower end of the anti-rebound frame being provided on the first part, and the upper end of the anti-rebound frame being provided on the second part.

7. The support base according to claim 1, wherein the latch is assembled with the shell body, and is movable transversally to engage with any of a plurality of locking openings provided on the anti-rebound frame.

8. The support base according to claim 1, wherein the latch is assembled with the anti-rebound frame, and is movable transversally to engage with any of a plurality of locking openings provided on the shell body.

9. The support base according to claim 1, wherein the channel is formed on an end surface of the shell body, the channel being opened on the bottom surface and extending upward, and the anti-rebound frame being assembled through the channel for sliding movement relative to the shell body.

10. The support base according to claim 1, wherein the anti-rebound frame includes:
a panel assembled with the shell body and operable to slide upward and downward relative to the shell body; and
a bar extension assembled with the panel, wherein the bar extension is adjustable relative to the panel between a first state where the bar extension is deployed upward past an upper edge of the panel, and a second state where the bar extension is stowed toward the shell body.

11. The support base according to claim 10, wherein the panel is movable relative to the shell body between a first position where a lower edge of the panel is adjacent to the bottom surface, and a second position where the lower edge of the panel extends downward past the bottom surface.

12. The support base according to claim 10, wherein the latch is operable to lock the panel with the shell body.

13. The support base according to claim 10, wherein the anti-rebound frame is adjustable to a configuration in which the panel extends downward past the bottom surface and the bar extension is deployed upward past the upper edge of the panel.

14. The support base according to claim 10, wherein the panel is connected with a spring, the spring biasing the panel downward.

15. The support base according to claim 10, wherein the bar extension is pivotally connected with the panel at a location near the upper edge.

16. The support base according to claim 10, wherein the panel includes a cavity, and the bar extension when in the second state is folded over the panel to be received in the cavity.

17. The support base according to claim 10, wherein the bar extension is pivotally connected with the panel about a pivot axis located near a lower edge of the panel.

18. The support base according to claim 10, wherein the bottom surface includes a cavity, and the bar extension when in the second state is received in the cavity of the bottom surface.

19. The support base according to claim 1, wherein the anti-rebound frame includes a pocket for receiving a plurality of lower anchor fasteners.

20. The support base according to claim 1, wherein the bottom surface has a cavity, and the anti-rebound frame is operable to flip down to stow in the cavity of the bottom surface.

21. The support base according to claim 20, wherein the shell body includes a shaft portion disposed near the bottom surface and connected with the anti-rebound frame, and the anti-rebound frame has a lower end movable away from the shaft portion to extend downward past the bottom surface.

22. The support base according to claim 21, wherein while the lower end remains adjacent to the bottom surface, the anti-rebound frame is rotatable about the shaft portion to stow in the cavity of the bottom surface.

23. The support base according to claim 1, wherein the anti-rebound frame includes a panel having an inner side provided with a receiving cavity sized to receive an electronic device, and a movable and transparent door is assembled with the panel for closing and opening the receiving cavity.

24. A support base for a child safety seat assembly, comprising:
- a shell body having a bottom surface that supports the support base when resting on a support surface, and an upper surface for installing a child carrier;
- an anti-rebound frame assembled with the shell body and having an upper end and a lower end, the anti-rebound frame being movable up and down relative to the shell body to extend upward past the upper surface and to extend downward past the bottom surface; and
- a latch operable to lock the anti-rebound frame with the shell body;
- wherein the anti-rebound frame is slidable relative to the shell body between a first position where the upper end extends upward past the upper surface and the lower end is positioned adjacent to the bottom surface, and a second position where the upper end extends upward past the upper surface and the lower end extends downward away from the bottom surface, the support base being installable on a vehicle seat with the anti-rebound frame in the first or second position placed adjacent to a seatback of the vehicle seat, the anti-rebound frame being further foldable to place the upper end below the upper surface.

25. The support base according to claim 24, wherein the anti-rebound frame including the upper and lower ends is integrally formed in one single body.

26. The support base according to claim 24, wherein the latch is assembled with the anti-rebound frame, and is movable transversally to engage with any of a plurality of locking openings provided on the shell body.

27. The support base according to claim 24, wherein the shell body further includes an end surface formed with a channel that is opened on the bottom surface and extend upward, and the anti-rebound frame is assembled through the channel for sliding movement relative to the shell body.

28. The support base according to claim 24, wherein the anti-rebound frame is operable to flip down to a stow position where the upper end is placed at an underside of the bottom surface.

29. The support base according to claim 24, wherein the shell body includes a shaft portion disposed near the bottom surface and connected with the anti-rebound frame, and the lower end of the anti-rebound frame is movable away from the shaft portion to extend downward past the bottom surface.

30. The support base according to claim 29, wherein while the lower end remains adjacent to the bottom surface, the anti-rebound frame is rotatable about the shaft portion to a stow position where the upper end is placed at an underside of the bottom surface.

31. The support base according to claim 1, wherein the anti-rebound frame while extending upward past the upper surface of the shell body is received at least partially in the channel.

32. The support base according to claim 24, wherein the shell body further has an end provided with a channel, and the anti-rebound frame is positionable at least partially in the channel.

* * * * *